United States Patent
Chae et al.

(10) Patent No.: US 10,945,240 B2
(45) Date of Patent: Mar. 9, 2021

(54) METHOD AND APPARATUS FOR TERMINAL TO TRANSMIT D2D DATA IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 16/324,101

(22) PCT Filed: Aug. 9, 2017

(86) PCT No.: PCT/KR2017/008644
§ 371 (c)(1),
(2) Date: Feb. 7, 2019

(87) PCT Pub. No.: WO2018/030791
PCT Pub. Date: Feb. 15, 2018

(65) Prior Publication Data
US 2019/0215817 A1  Jul. 11, 2019

Related U.S. Application Data

(60) Provisional application No. 62/372,788, filed on Aug. 9, 2016, provisional application No. 62/378,237, filed on Aug. 23, 2016, provisional application No. 62/378,693, filed on Aug. 24, 2016, provisional application No. 62/381,595, filed on Aug. 31, 2016.

(51) Int. Cl.
*H04W 72/04*  (2009.01)
*H04W 4/70*  (2018.01)
(Continued)

(52) U.S. Cl.
CPC ......... *H04W 72/0406* (2013.01); *H04L 5/00* (2013.01); *H04W 4/70* (2018.02);
(Continued)

(58) Field of Classification Search
CPC ......... H04W 72/0406; H04W 72/0453; H04W 4/70; H04W 88/02; H04L 5/00
See application file for complete search history.

(56) References Cited

U.S. PATENT DOCUMENTS

| | | | |
|---|---|---|---|
| 2016/0044618 | A1 | 2/2016 | Sheng et al. |
| 2016/0135240 | A1 | 5/2016 | Yoon |

(Continued)

FOREIGN PATENT DOCUMENTS

| | | |
|---|---|---|
| CN | 105451211 | 3/2016 |
| CN | 105813204 | 7/2016 |

(Continued)

OTHER PUBLICATIONS

PCT International Application No. PCT/KR2017/008644, Written Opinion of the International Searching Authority dated Nov. 22, 2017, 17 pages.

(Continued)

*Primary Examiner* — Kent Krueger
(74) *Attorney, Agent, or Firm* — Lee, Hong, Degerman, Kang & Waimey PC

(57) ABSTRACT

One embodiment of the present invention relates to a method for a device-to-device (D2D) terminal to transmit a physical sidelink shared channel (PSSCH) in a wireless communication system, the method comprising: a step in which the terminal selects one or more resource blocks to transmit the PSSCH in a subchannel; and a step in which the terminal transmits the PSSCH via the selected one or more resource blocks, wherein the number of the selected one or more resource blocks is the largest value, among values corresponding to the products of the respective exponentiation values of 2, 3, and 5, which does not exceed the number of all resource blocks available for PSSCH transmission in the subchannel.

9 Claims, 25 Drawing Sheets

(51) Int. Cl.
*H04L 5/00* (2006.01)
*H04W 4/40* (2018.01)
*H04W 88/02* (2009.01)

(52) U.S. Cl.
CPC .......... *H04W 72/0453* (2013.01); *H04W 4/40* (2018.02); *H04W 88/02* (2013.01)

(56) References Cited

U.S. PATENT DOCUMENTS

2018/0212733 A1* 7/2018 Khoryaev ............. H04L 5/0051
2019/0182840 A1* 6/2019 Feng ....................... H04W 4/44

FOREIGN PATENT DOCUMENTS

| EP | 3242515 | 11/2017 |
| KR | 101601922 | 3/2016 |
| KR | 1020160055028 | 5/2016 |
| WO | 2015065014 | 5/2015 |
| WO | 2015163662 | 10/2015 |
| WO | 2016107244 | 7/2016 |
| WO | 2016108456 | 7/2016 |

OTHER PUBLICATIONS

Samsung, "DMRS configuration for PSSCH and PSCCH", 3GPP TSG RAN WG1 Meeting #85, R1-164754, May 2016, 3 pages.
QUALCOMM, "DM-RS Enhancements for V2V PSCCH and PSSCH", 3GPP TSG RAN WG1 Meeting #85, R1-164417, May 2016, 7 pages.
Samsung, "Sensing and resource selection for collision avoidance", 3GPP TSG RAN WG1 Meeting #84bis, R1-162676, Apr. 2016, 6 pages.
3rd Generation Partnership Project (3GPP), "Technical Specification Group Radio Access Network; Evolved Universal Terrestrial Radio Access (E-UTRA); Physical channels and modulation (Release 13)," 3GPP TS 36.211 V13.1.0, Mar. 2016, 169 pages.
3rd Generation Partnership Project (3GPP), "Technical Specification Group Radio Access Network; Evolved Universal Terrestrial Radio Access (E-UTRA); Physical channels and modulation (Release 13)," 3GPP TS 36.213 V13.1.1, Section 14-15, Mar. 2016, pp. 334-353, 20 pages.
European Patent Office Application Serial No. 17839809.5, Search Report dated Mar. 9, 2020, 10 pages.
Japan Patent Office Application No. 2019-507309, Office Action dated Apr. 7, 2020, 5 pages.
B Coll-Perales et al., "Empirical models of the communications performance of Multi-hop Cellular Networks using D2D," Journal of Network and Computer Applications, XP055562350, Dec. 2015, 36 pages.
3rd Generation Partnership Project (3GPP), "Technical Specification Group Radio Access Network; Evolved Universal Terrestrial Radio Access (E-UTRA); Physical channels and modulation (Release 13)," 3GPP TS 36.211 V13.2.0, Jun. 2016, 170 pages.

* cited by examiner

FIG. 5
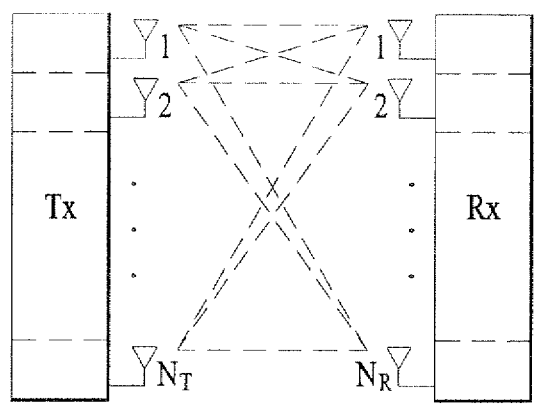
(a)
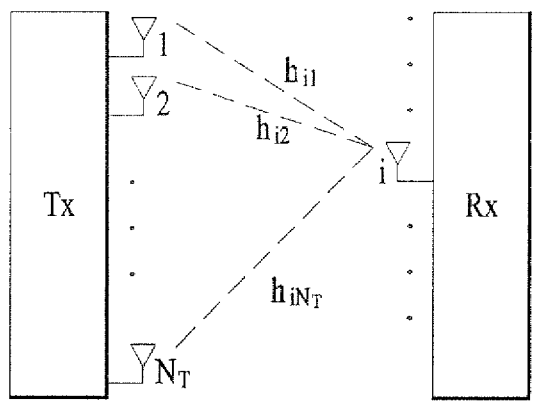
(b)

FIG. 8
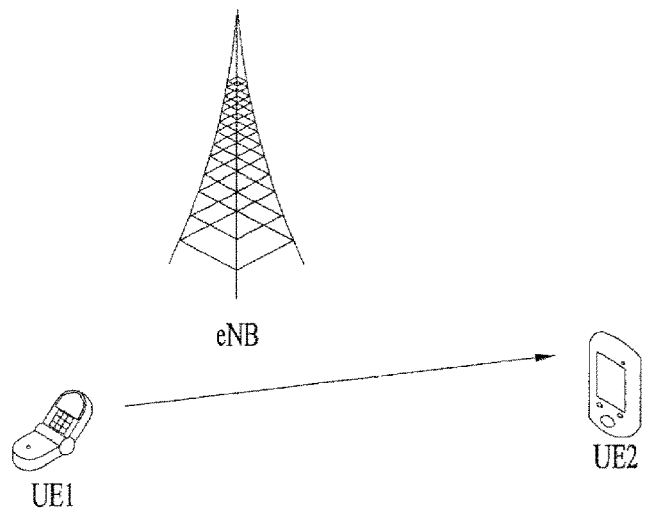
(a)
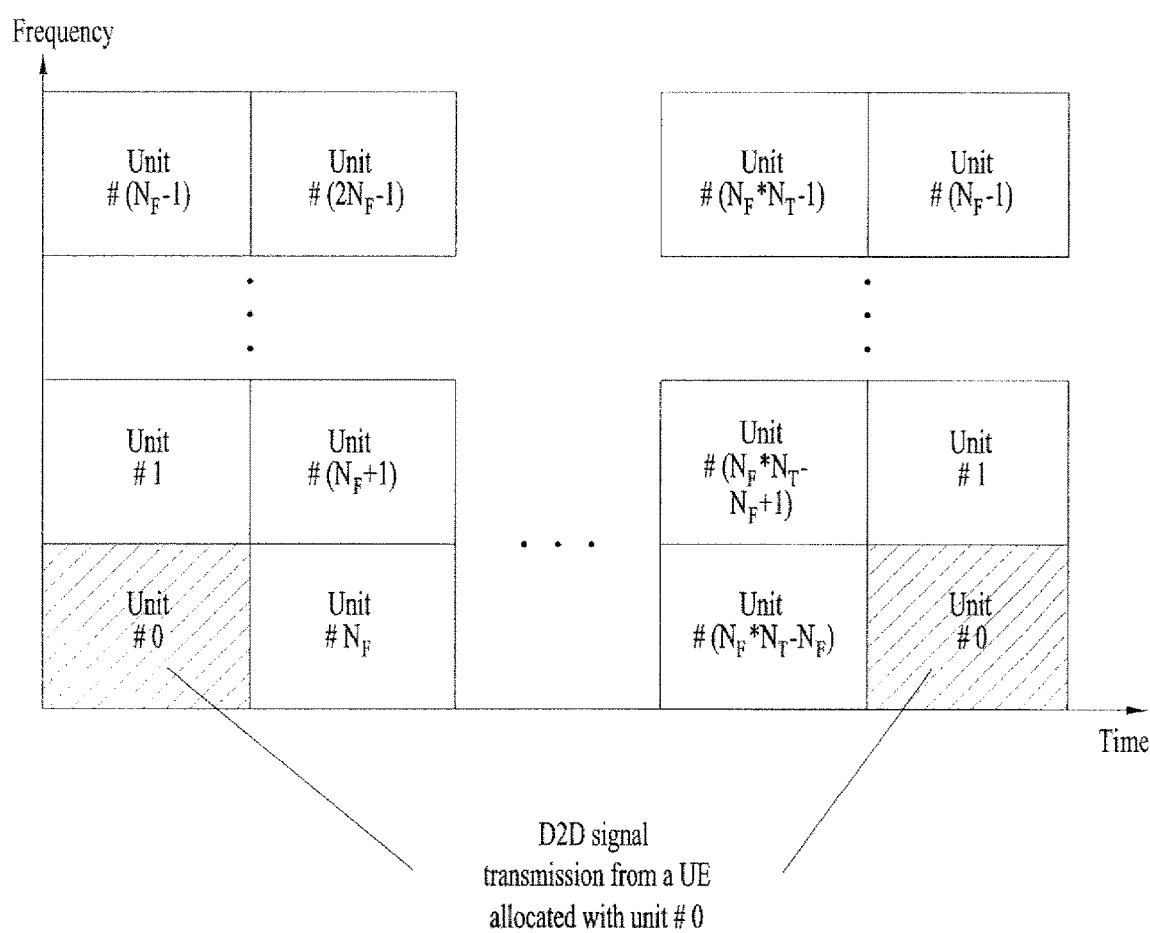
(b)

(a) with CI        (b) without CI (a) with CI          (b) without CI (a) with CI

METHOD AND APPARATUS FOR TERMINAL TO TRANSMIT D2D DATA IN WIRELESS COMMUNICATION SYSTEM

CROSS-REFERENCE TO RELATED APPLICATIONS

This application is the National Stage filing under 35 U.S.C. 371 of International Application No. PCT/KR2017/008644, filed on Aug. 9, 2017, which claims the benefit of U.S. Provisional Application No. 62/372,788, filed on Aug. 9, 2016, 62/378,237, filed on Aug. 23, 2016, 62/378,693, filed on Aug. 24, 2016, and 62/381,595, filed on Aug. 31, 2016, the contents of which are all hereby incorporated by reference herein in their entireties.

TECHNICAL FIELD

Following description relates to a wireless communication system, and more particularly, to a method of transmitting data by selecting a resource block on a subchannel in a device-to-device (D2D) communication and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE OF THE INVENTION

Technical Task

A technical task of the present invention is to provide a method for a D2D UE to select a resource block for transmitting data on a subchannel, various resource structures capable of transmitting control information and data, and the like.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve these and other advantages and in accordance with the purpose of the present invention, as embodied and broadly described, according to one embodiment, a method of transmitting a PSSCH (Physical Sidelink Shared Channel), which is transmitted by a D2D (Device-to-Device) user equipment (UE) in a wireless communication system, includes the steps of selecting, by the UE, one or more resource blocks in which the PSSCH is to be transmitted from a subchannel, and transmitting, by the UE, the PSSCH via the one or more selected resource blocks. In this case, the number of the one or more selected resource blocks corresponds to the greatest value not exceeding the total number of resource blocks usable for transmitting the PSSCH on the subchannel among values corresponding to multiplication of exponentiations of 2, 3, and 5.

To further achieve these and other advantages and in accordance with the purpose of the present invention, according to a different embodiment, a D2D (Device-to-Device) user equipment (UE) transmitting a PSSCH (Physical Sidelink Shared Channel) in a wireless communication system includes a transmitter and a receiver, and a processor, the processor configured to select one or more resource blocks in which the PSSCH is to be transmitted from a subchannel, the processor configured to transmit the PSSCH using the transmitter via the one or more selected resource blocks. In this case, the number of the one or more selected resource blocks corresponds to the greatest value not exceeding the total number of resource blocks usable for transmitting the PSSCH on the subchannel among values corresponding to multiplication of exponentiations of 2, 3, and 5.

When the PSCCH and the PSSCH are transmitted in continuous resource blocks, the total number of resource blocks usable for transmitting the PSSCH on the subchannel can be obtained by subtracting the number of resource blocks used for transmitting the PSSCH from the total number of resource blocks of the subchannel.

When the PSCCH and the PSSCH are transmitted in discontinuous resource blocks, the total number of resource blocks usable for transmitting the PSSCH on the subchannel may correspond to the total number of resource blocks of the subchannel.

Exponents of the exponentiations of 2, 3, and 5 may correspond to integers which are not negative numbers.

The total number of resource blocks of the subchannel may correspond to one selected from the group consisting of 5, 6, 10, 15, 20, 25, 50, 75, and 100.

The method can further include the step of selecting, by the UE, the subchannel.

When the number of subchannels to be selected by the UE is getting smaller, the UE can preferentially select a subchannel positioned at an edge of the entire frequency band.

Advantageous Effects

According to the present invention, when a UE transmits D2D data using SC-FDM, it is able to lower implementation complexity (complexity of DFT precoding) of the UE and reduce signaling overhead between additional Tx/Rx UEs.

It will be appreciated by persons skilled in the art that the objects that could be achieved with the present invention are not limited to what has been particularly described hereinabove and other objects that the present invention could achieve will be more clearly understood from the following detailed description.

DESCRIPTION OF DRAWINGS

The accompanying drawings, which are included to provide a further understanding of the present invention and are incorporated in and constitute a part of this application, illustrate embodiments of the present invention and together with the description serve to explain the principle of the disclosure. In the drawings:

FIG. 5 is a view illustrating the configuration of a wireless communication system having multiple antennas;

FIG. 8 is a view illustrating an exemplary D2D resource pool for D2D communication;

BEST MODE

Mode for Invention

Figure 1:
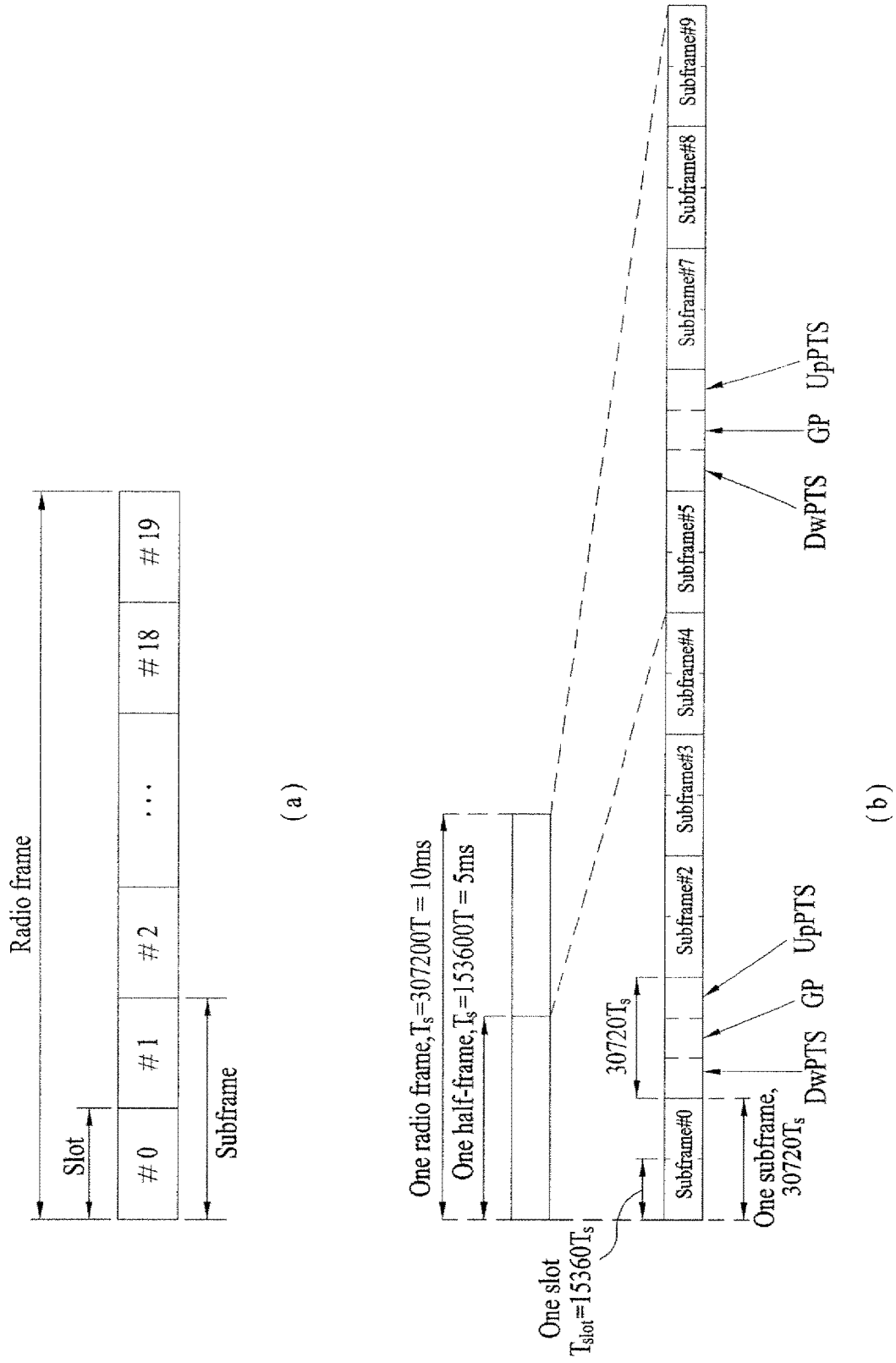
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
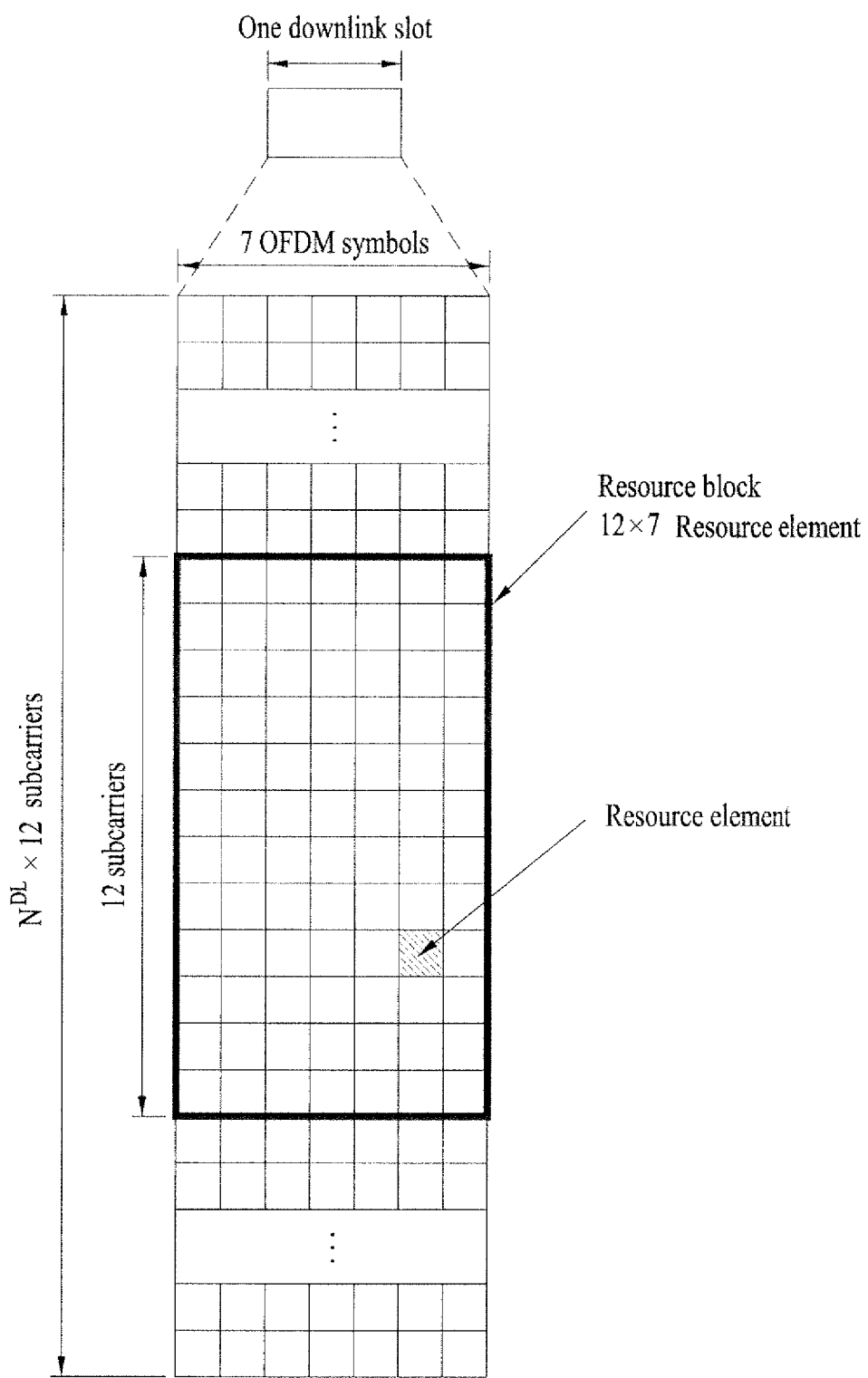
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
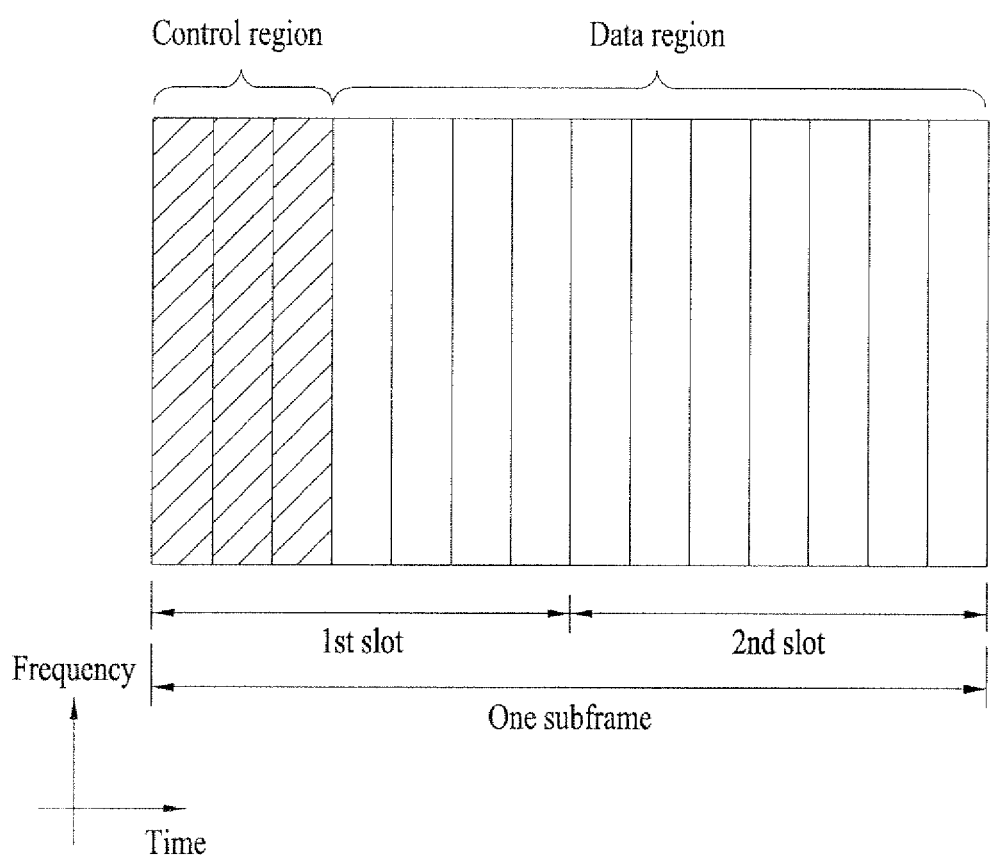
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
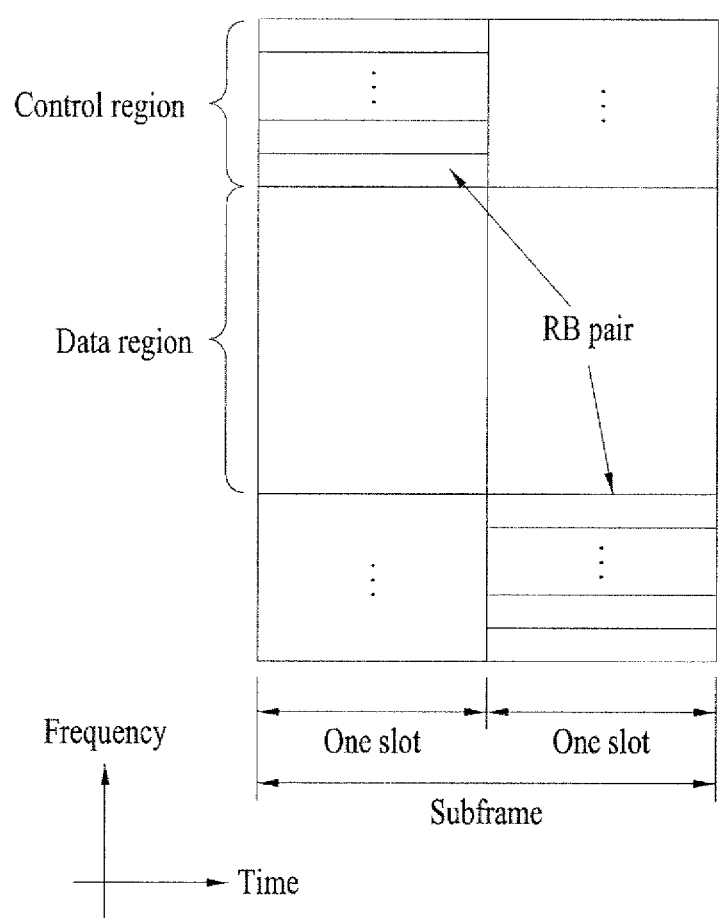
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_j \\ \vdots \\ n_{N_R} \end{bmatrix} = Hx + n \quad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
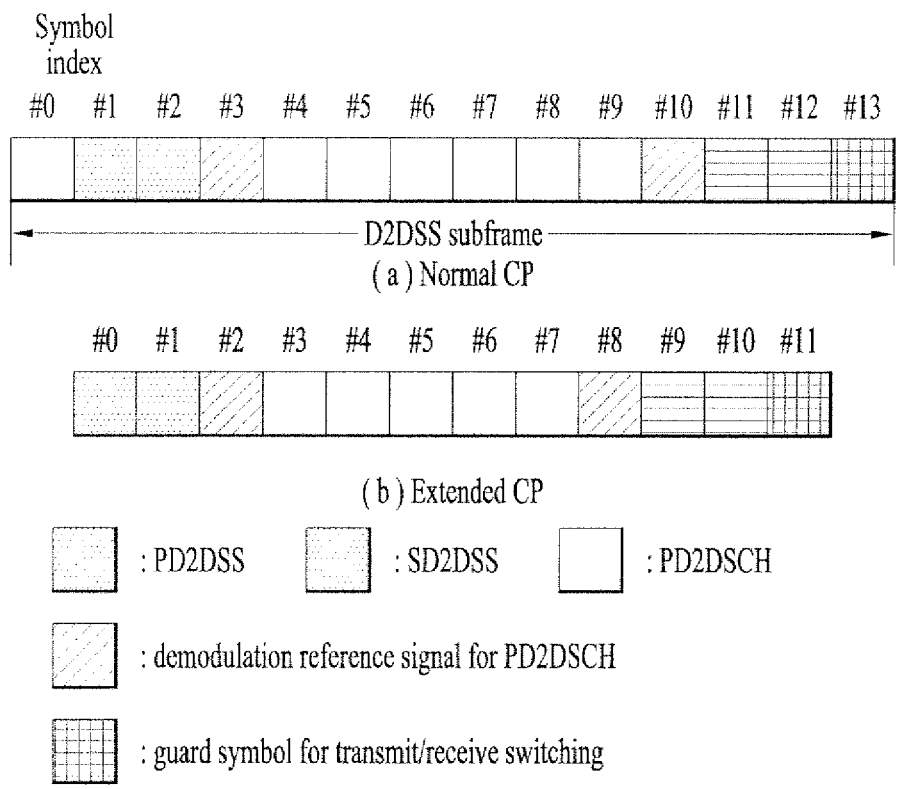
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
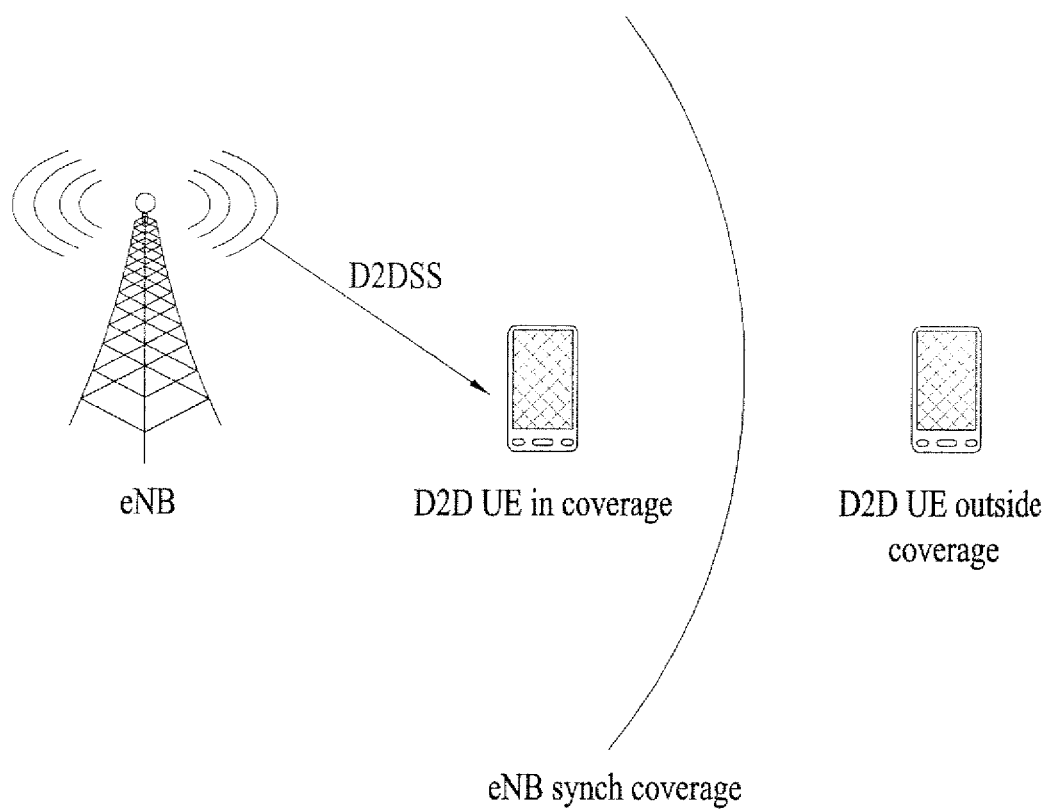
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
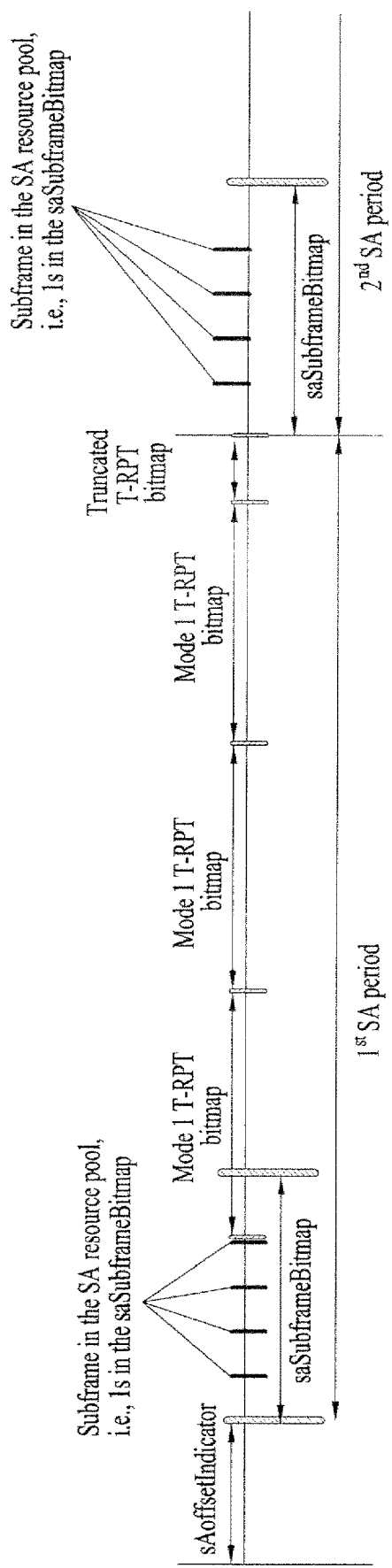
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to is set in a T-RPT bitmap in an indicated T-RPT, and transmits one medium access control layer protocol data unit (MAC PDU) four times.

In the following, when a control signal and data are transmitted in the same subframe, a method capable of reducing interference between UEs while obtaining diversity of the control signal and reducing PAPR is explained. In the following description, a control signal and a scheduling signal are referred to as control information (CI). All or a part of such information for transmitting/receiving data as MCS, resource allocation, Tx power, NDI (new data indicator), RV (redundancy version), retransmission number, CQI, PMI, etc. can be transmitted in a manner of being included in the CI.

Structure and Method for Transmitting Message

According to one embodiment of the present invention, when a message is transmitted, a format (including an RB size of SA) for transmitting the SA, a position to which the SA is transmitted, a scheme, SA pool configuration, and the like may vary according to a type or a size of the message, a type of a UE transmitting the message, and a transmitted RB size.

Specifically, a scheme of multiplexing control information (also referred to as SA) and data may vary based on a size of a message. In particular, when the size of the message is greater than a predetermined value, control information for the message and the message are respectively transmitted in resources distinguished from each other on a time axis (i.e., TDM transmission). When the size of the message is less than the predetermined value, the control information for the message and the message can be respectively transmitted in resources distinguished from each other on a frequency axis (i.e., FDM transmission).

In this case, the message having the size greater than the predetermined value corresponds to a periodic message and the message having the size less than the predetermined value may correspond to an event triggered message. In particular, when a periodic message is transmitted, SA and data are transmitted in a manner of being TDMed. On the other hand, when an event triggered message is transmitted, SA and data can be transmitted in a manner of being FDMed.

Figure 10:
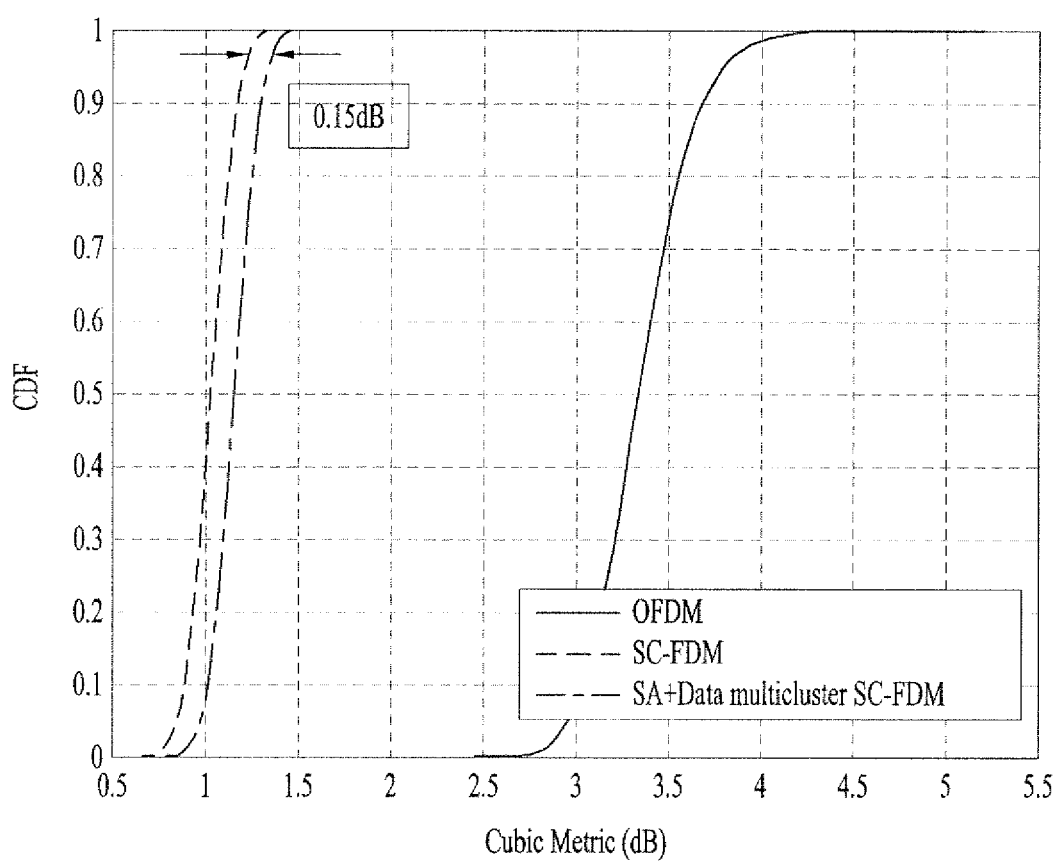
FIGS. 10 and 11 illustrate a simulation result for an impact of cubic metric when embodiments of the present invention are used.
Figure 11:
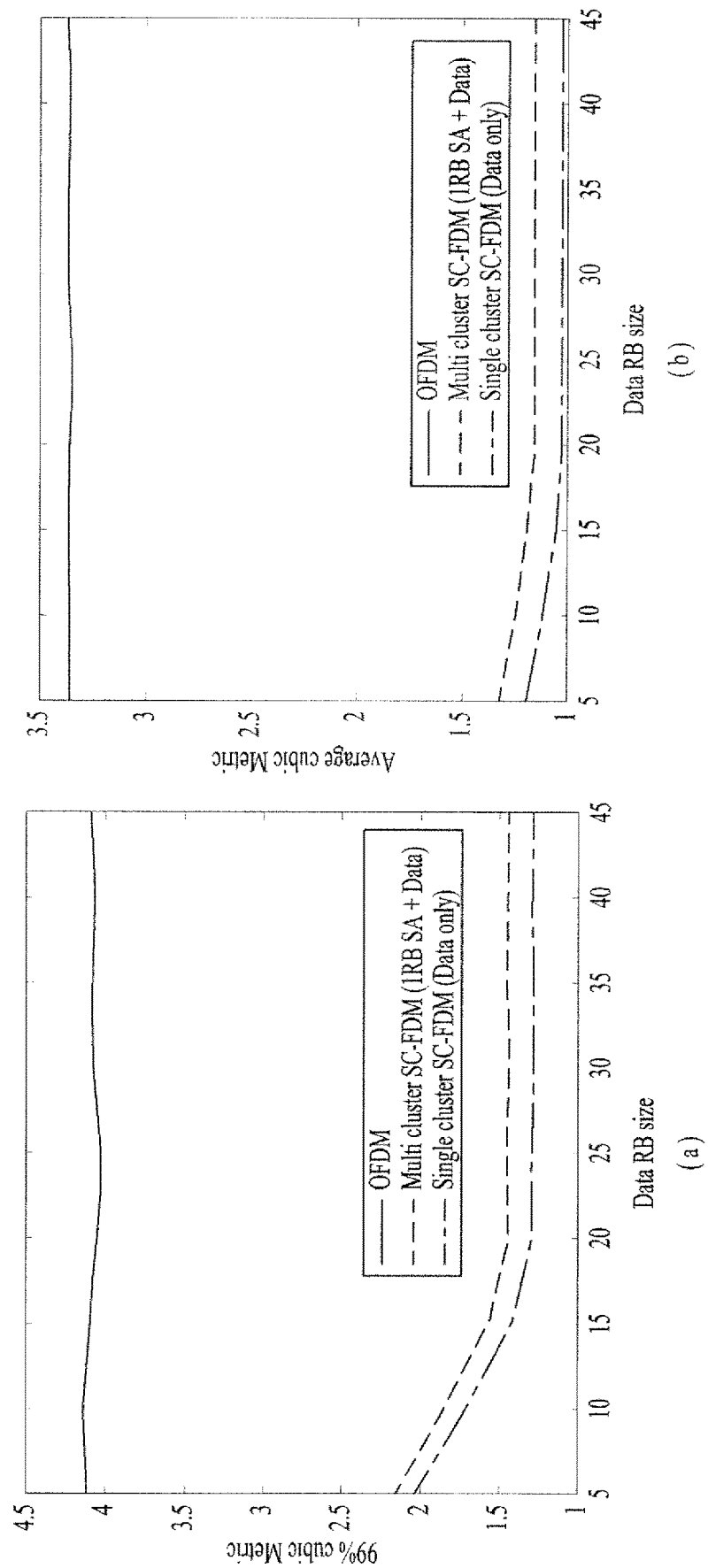

In this case, when a message of a big size (or a periodic message) corresponds to a wideband transmission and a message of a small size (or an event triggered message) corresponds to a narrowband transmission (e.g., 1 RB), although a different multiplexing scheme is used, a loss is insignificant in terms of CM/PAPR. Specifically, referring to FIGS. 10 and 11, when a message of a big size (or a periodic message) corresponds to 40-RB transmission and a message of a small size (or an event triggered message) corresponds to 1-RB transmission (multi cluster SC-FDM in the drawing), Cubic metric is compared with an OFDM case and a single cluster SC-FDM case. As illustrated in the drawings, although multi cluster SC-FDM transmission is performed by changing a multiplexing scheme, it is able to see that a value of cubic metric (CM) has almost no difference with a value of the single cluster SC-FDM case. In particular, when a narrowband transmission such as a control signal and a wideband data transmission are performed at the same time, it is able to see that it does not considerably increase CM. On the other hand, when a TDM scheme performed on SA and data and a FDM scheme performed on SA and data are used in a manner of being mixed, in case of a message intending to secure large coverage of the SA, the message is transmitted by performing TDM on the SA and the data. Otherwise, the message is transmitted by performing FDM on the SA and the data. By doing so, it is able to mitigate a half-duplex problem. In particular, whether to transmit the SA and the data at the same time can be flexibly determined according to a situation, thereby improving system performance, message forwarding capability of a Tx UE, interference avoidance capability, and the like. More specifically, when SA and data are transmitted in a manner of being TDMed, since coverage of the SA is widened and the number of UEs decoding SA of a corresponding UE increases, it is able to avoid a data resource which is connected after the SA decoding, thereby improving interference avoidance performance.

Figure 12:
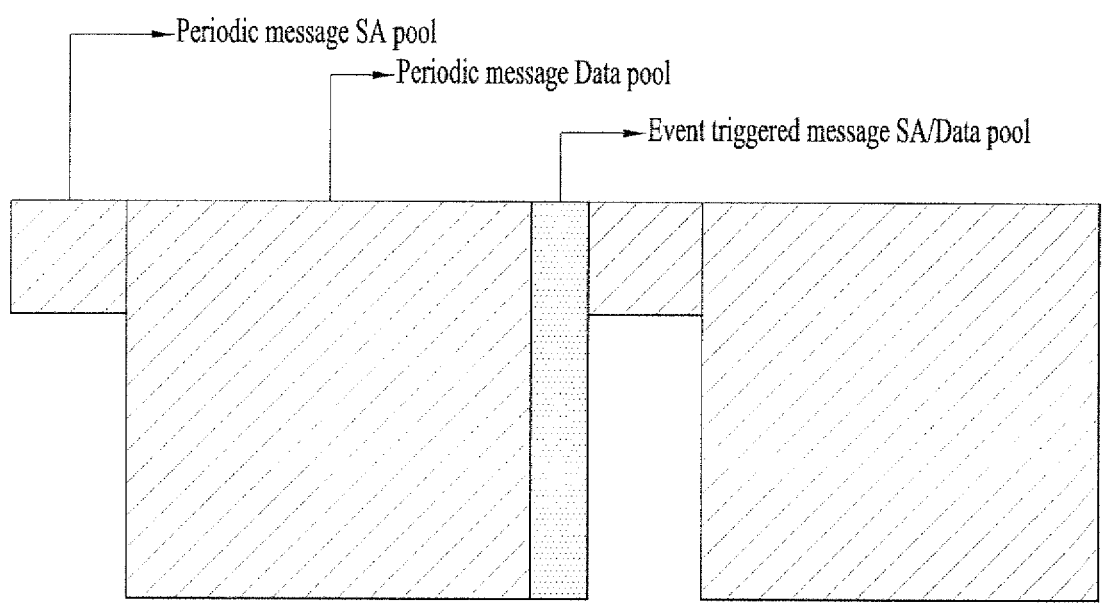
FIGS. 12 to 23 are diagrams illustrating a resource structure/resource allocation method according to an embodiment of the present invention.
Figure 13:
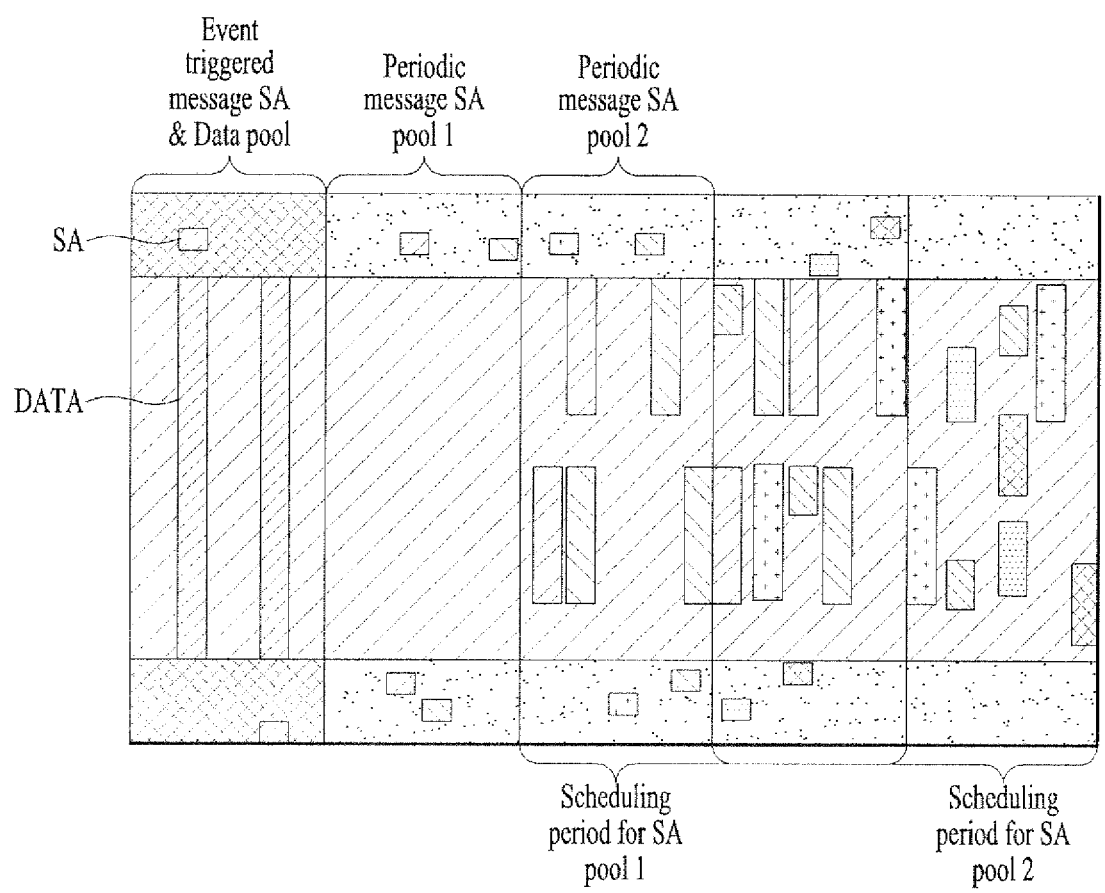

As mentioned in the foregoing description, when a multiplexing scheme is differently used according to a message size, a message type, or the like, FIGS. 12 and 13 illustrate an example for an available resource structure/resource allocation. However, all available resource structures are not illustrated in FIGS. 12 and 13. It may use various resource structures rather than the illustrated resource structure if the resource structures fit the aforementioned contents.

Meanwhile, in the foregoing description, a message of a small size (or an event triggered message) can be transmitted using a FDM scheme. In this case, the FDM scheme can use schemes described in the following. Of course, each of various resource structures/allocation schemes described in the following can configure an independent embodiment.

Figure 14:
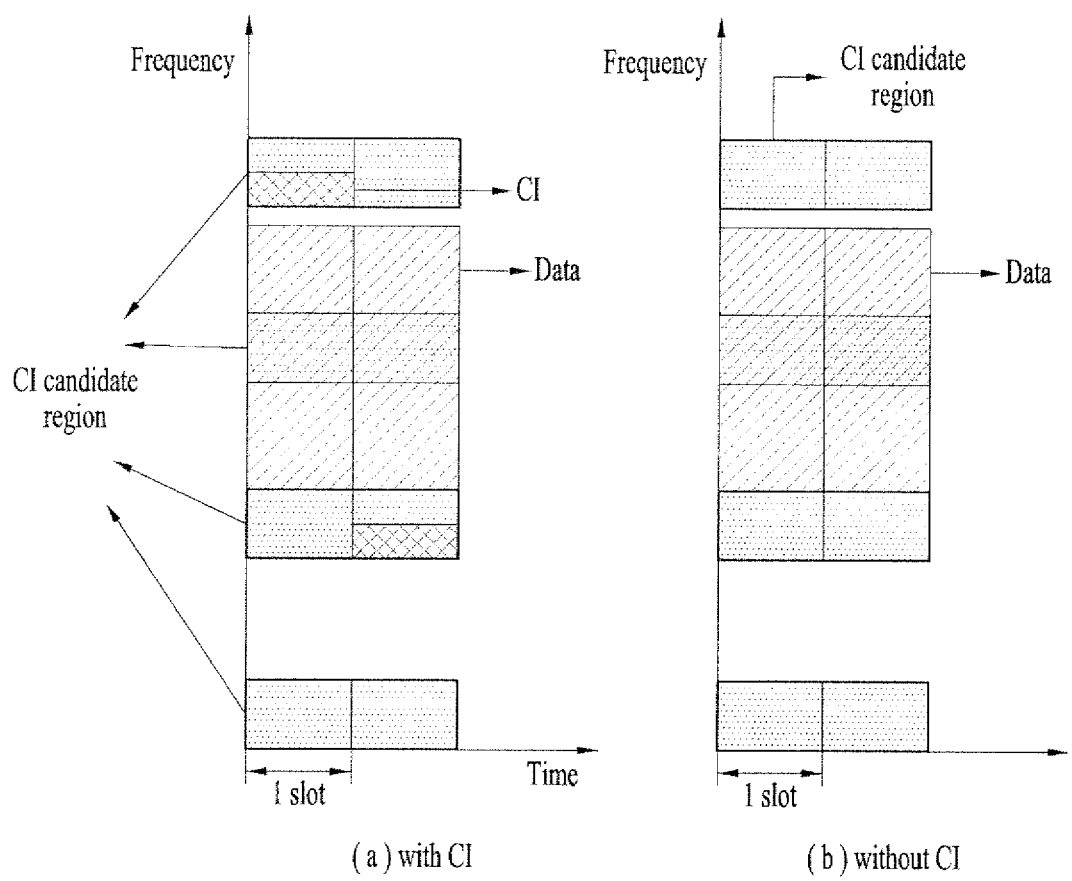

FIG. 14 illustrates an example that CI candidate regions are determined and CI is transmitted in one of the CI candidate regions. When control information and a message are respectively transmitted in resources distinguished from each other on a frequency axis, control information for the message can be transmitted in one or more regions among a plurality of predetermined candidate regions. To this end, a partial resource region separated from frequency domain in advance is configured as a region capable of transmitting CI and Rx UEs can perform blind decoding on the CI in the region. In this case, the predetermined candidate regions can include slots on a time axis and the predetermined number of RBs on a frequency axis.

A position of a candidate region in which control information is included in the second slot can be restricted by a position of a candidate region in which control information is included in the first slot. For example, the CI of the second slot can be transmitted in i) a CI region included within +/−N1 RB only, ii) a region within +N2 RB only, or iii) a region within −N3 RB only on the basis of a CI position in the first slot. In this case, N1, N2, and N3 may correspond to predetermined values. In the first slot, i) to iii) can be differently determined according to a position of CI. In order to satisfy single carrier property in the SC-FDMA scheme, since it is necessary for positions to be contiguous in frequency domain, a CI position of the second slot is restricted.

In this case, a transmission position of data can be configured irrespective of CI or can be determined in a manner of being interlocked with a position of the CI. The CI may or may not explicitly indicate RA of the data.

It may apply at least one selected from among rules a) to d) to make a UE not to perform data decoding (or blind decoding) at a region considerably deviated from a position at which CI is actually transmitted.

a) Data is not transmitted at a frequency resource position at which CI is transmitted.

b) Data is transmitted in i) a region within +/−K1 RB only, ii) a region within +K2 RB only, or iii) a region within −K3 RB only in an RB in which CI is transmitted. In this case, K1, K2, and K3 may correspond to predetermined values and conditions i to iii can be differently applied according to a position at which CI is transmitted. The rules above can be applied to prevent CI and data from being transmitted in a manner of being considerably apart. For example, it may be able to determine a rule that data is to be consecutively transmitted in an RB index of positive direction only on the basis of a position at which CI is transmitted. Based on the rule, an Rx UE is able to implicitly identify a starting RB of a position at which the data is transmitted based on the position at which the CI is transmitted. In the aspect of a Tx UE, when the UE determines a position at which data is transmitted, it may be able to determine a rule that CI is to be transmitted in the lowest RB index at the position at which the data is transmitted (of course, the RB should be an RB configured to transmit CI in advance).

c) CI of the second slot is not transmitted at a frequency position identical to a CI position of the first slot.

d) CI is not positioned at the center of a data RB. Or, a center RB of the entire frequency band is not included in a plurality of the candidate regions. Although CI and data generate an independent SC-FDM signal, the rule does not make 3 or more clusters to prevent PAPR from being excessively increased.

The Rx UE may not perform decoding on data in a region in which the data is not transmitted in consideration of at least one selected from among the rules described in a) to d).

Subsequently, CI of the first slot and CI of the second slot can be independently determined. In this case, it may be able to determine a rule to exclude a case that CI is transmitted at the same frequency position in the two slots. In particular, a candidate region in which control information is included in the second slot and a candidate region in which control information is included in the first slot can be positioned at a different frequency band. A UE may perform blind decoding on CI in the first slot and the second slot, respectively. In this case, in order to prevent excessive blind decoding, it may be able to set a limit on the number of candidate CIs according to a slot. For example, when BD is performed as many as equal to or less than X times in each subframe, the maximum CI number according to a slot can be determined by floor (sqrt (X)).

In the foregoing description, when two or more RSs are assigned to a slot, slot hopping can be applied to data as well. In this case, the rule b) can be independently applied to according to a slot.

Figure 15:
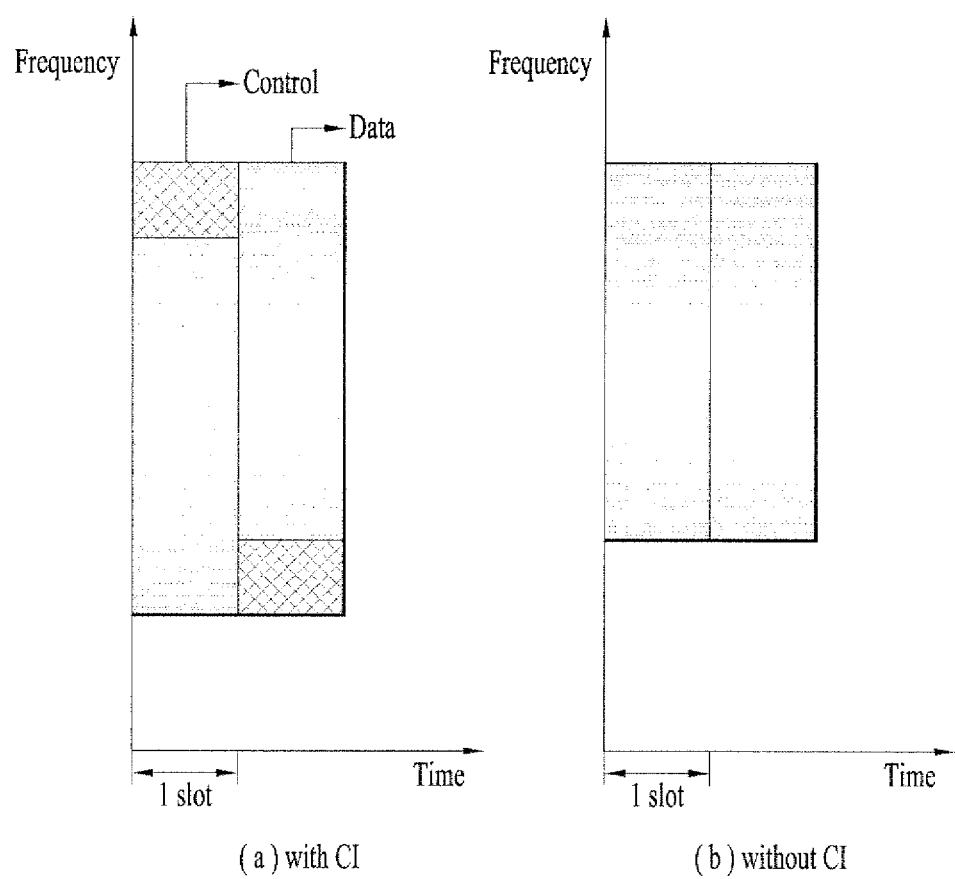

Subsequently, FIGS. 15 to 17 relate to a method of transmitting a V2X channel by reusing a slot hopping structure similar to PUCCH and a PUSCH structure for data. In this case, it is preferable to transmit CI and data by concatenating the CI with the data to reduce in-band emission to a different UE. More specifically, it is able to minimize an in-band emission component (EVM shoulder) generated in the vicinity of an allocated RB.

Specifically, CI is assigned by performing hopping between slots and data is assigned between CIs. In particular, when data is concatenated with CI in frequency domain, a position at which the CI is transmitted changes according to a slot. The CI and/or the data can be transmitted using a legacy PUCCH structure or a PUSCH structure. For example, the CI may use such a structure of 2 RSs per slot as a PUCCH format 2/3 and the data may use such a structure of 1 RS per slot as PUSCH. The CI and/or the data can also be transmitted using a legacy PSCCH/PSSCH structure (puncturing or rate matching can be performed on the last symbol). Or, the CI and/or the data can also be transmitted using a modified PSCCH/PSSCH structure. In this case, it may use a structure of performing puncturing on a partial symbol only instead of the whole of the last symbol. Or, it may additionally assign a DMRS to cope with high mobility.

In this case, an Rx UE can identify a position of data by performing blind decoding on CI in each slot. When RA information is explicitly included in the CI, if a UE performs blind decoding on a position of the CI, final confirmation can be performed via CI contents. When CI is transmitted in each slot, the CI can be transmitted in a form that the same RV is repeated. Or, similar to an incremental redundancy, it may transmit a different RV according to a slot (e.g., first slot RV 0, second slot RV 1). In this case, a data RE can be mapped using one of three methods described in the following.

First of all, encoding and modulation symbol mapping are performed on two slots except a CI region according to a determined RB size. When mapping is actually performed on an RE, the mapping can be performed by shifting the mapping as much as an RB occupied by the CI region (or a group REs, when CI fails to fill up a specific RB) according to a slot. In other word, a codeword is generated under the assumption that data does not have CI. Then, the data is mapped in a manner that the first or second slot is shifted as much as a region occupied by CI in a subframe in which the CI is transmitted. This mapping method is illustrated in FIG. 15. According to the mapping method, a data RE can be dynamically changed according to whether or not CI is transmitted.

Figure 16:
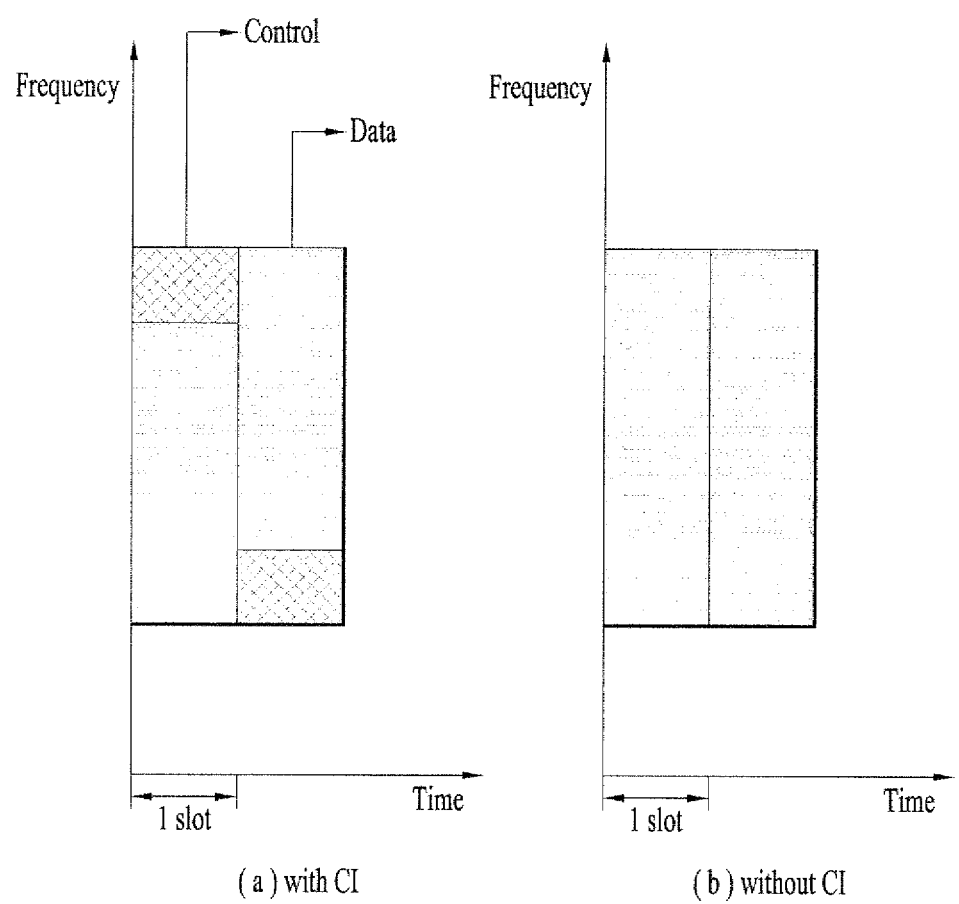

Secondly, as illustrated in FIG. 16, a data RE is mapped to a CI region. Then, when CI is transmitted, rate matching can be performed on a CI part. According to the present method, a codeword is generated in consideration of a case that CI is not transmitted in every subframe and rate matching is performed on a CI region in a subframe in which CI is transmitted. The present method has a merit in that an RB size is identically configured irrespective of whether or not CI is transmitted.

Figure 17:
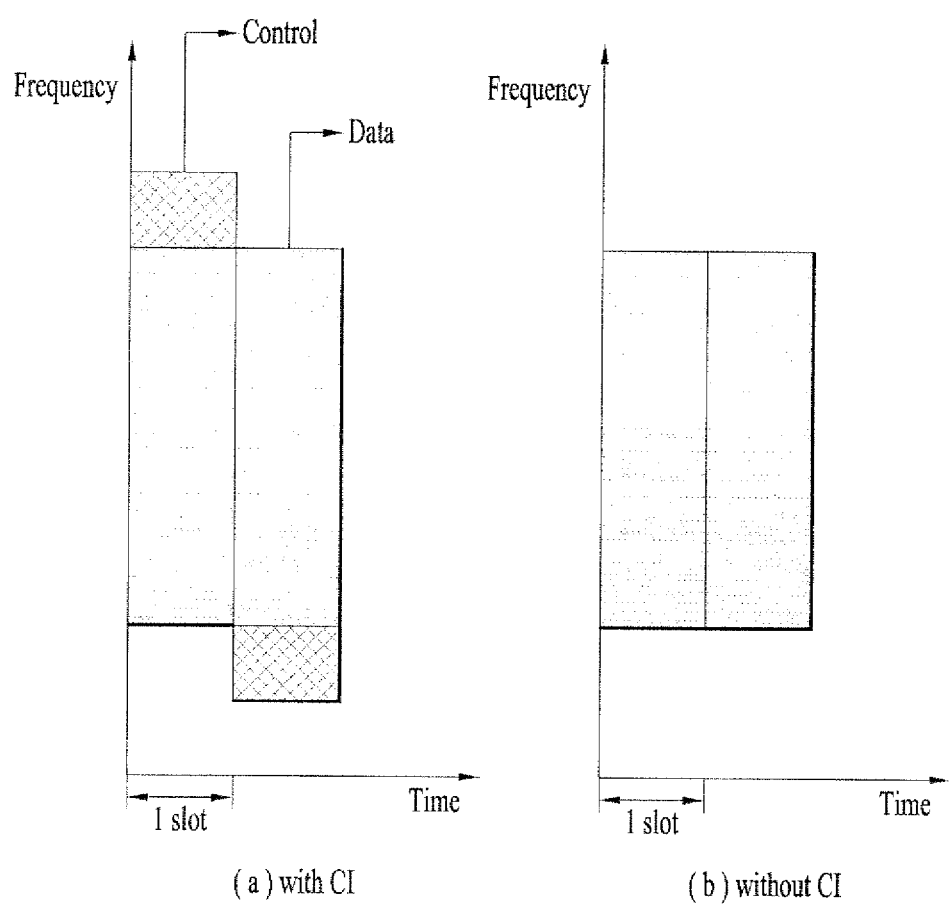

Thirdly, as illustrated in FIG. 17, data mapping is performed at the same frequency position during two slots and CI can be mapped to a position near an RB in which data is transmitted. According to the present method, it may have a merit in that it is able to have the same data codeword to RE mapping irrespective of whether or not CI is transmitted. However, when CI is transmitted, since the CI is transmitted to a position near a data region, an effective RB size may change.

According to the abovementioned three methods, although CI is assigned to the top in the first slot (CI is assigned to a side where an RB index is high), an opposite case is feasible as well. In particular, CI is assigned to the bottom in the first slot and CI can be assigned to the top in the second slot.

Figure 18:
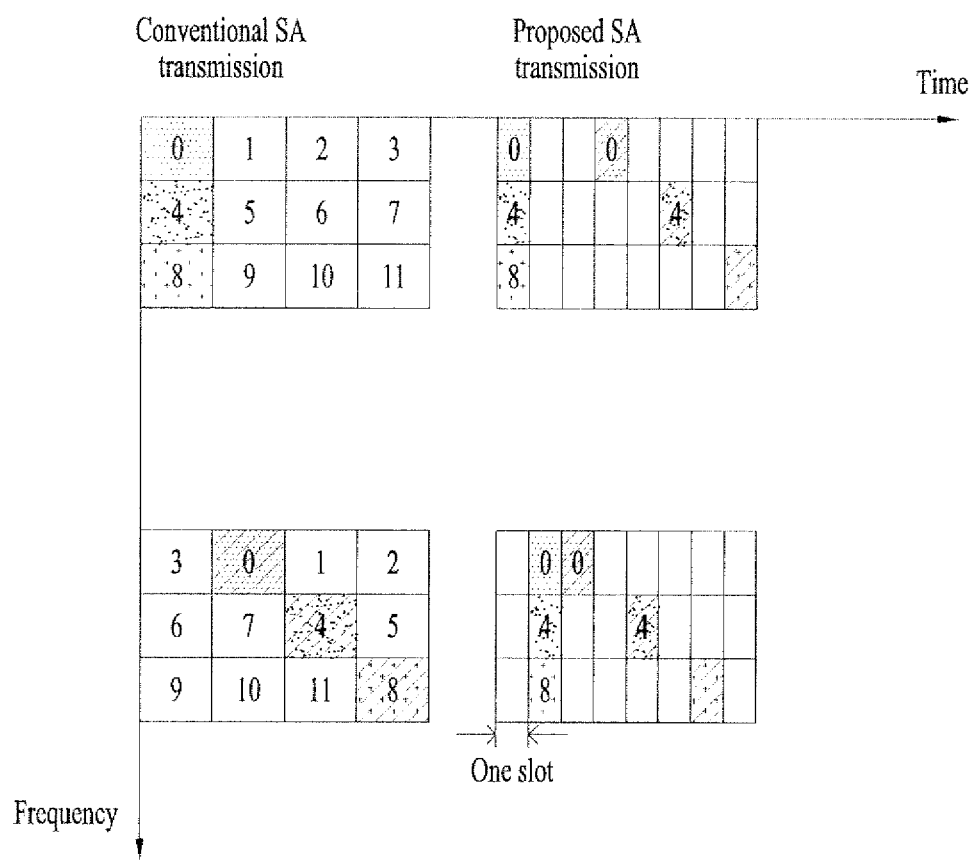

Meanwhile, the proposed slot hopping scheme of the CI can be applied in a manner that a slot hops within an SA pool in a legacy D2D operation. In particular, in 3GPP rel. 12/13, SA performs transmission two times within an SA pool. In this case, a case of receiving one SA transmission only among the two SA transmissions may occur due to a half-duplex constraint. In this case, SA reception performance can be considerably degraded due to the failure in obtaining a frequency diversity gain. In this case, if slot hopping is allowed, since it is able to obtain a frequency diversity gain, a probability of receiving SA can be increased. FIG. 18 illustrates an embodiment of the SA slot hopping. An operation of the SA slot hopping can be configured by a network. Or, whether slot hopping is enabled or disabled can be determined in advance. The slot hopping operation can be selectively applied to a case of an in-coverage UE having a small frequency offset, a case of a UE (e.g., a pedestrian UE) having a low speed and a small frequency offset, and a case of assigning two or more DMRSs according to a slot to overcome the occurrence of a big frequency offset and Doppler shift.

Figure 19:
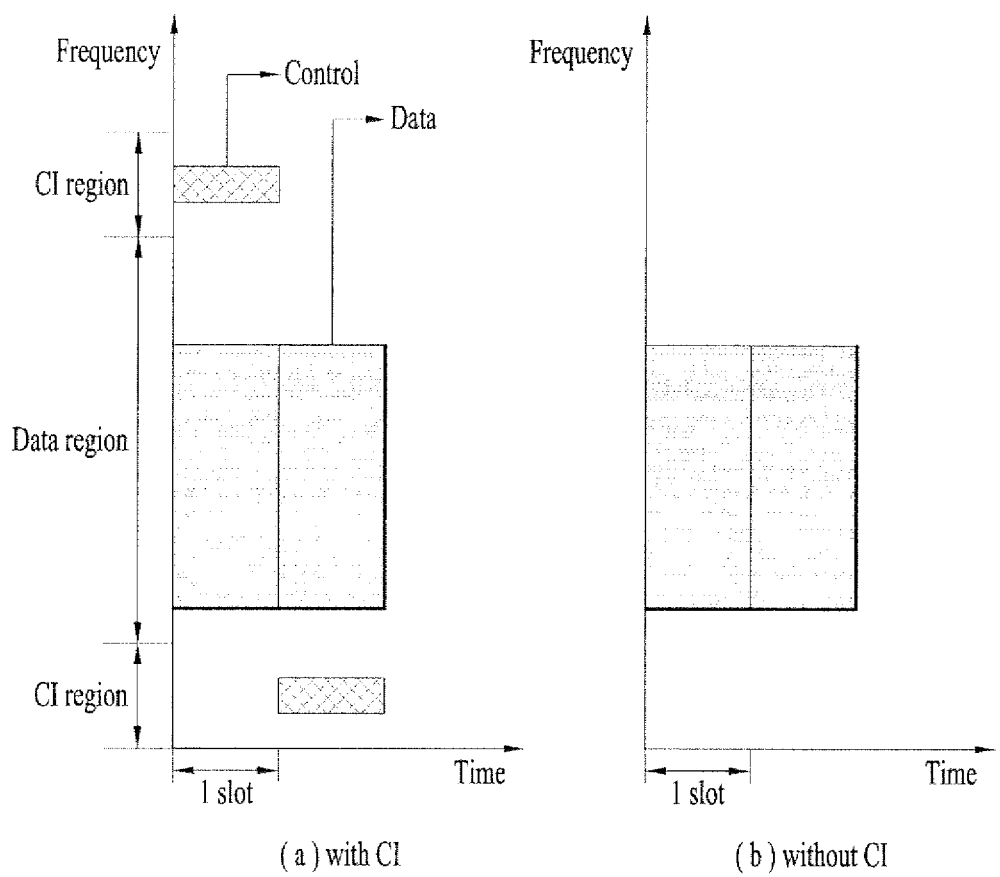
Figure 20:
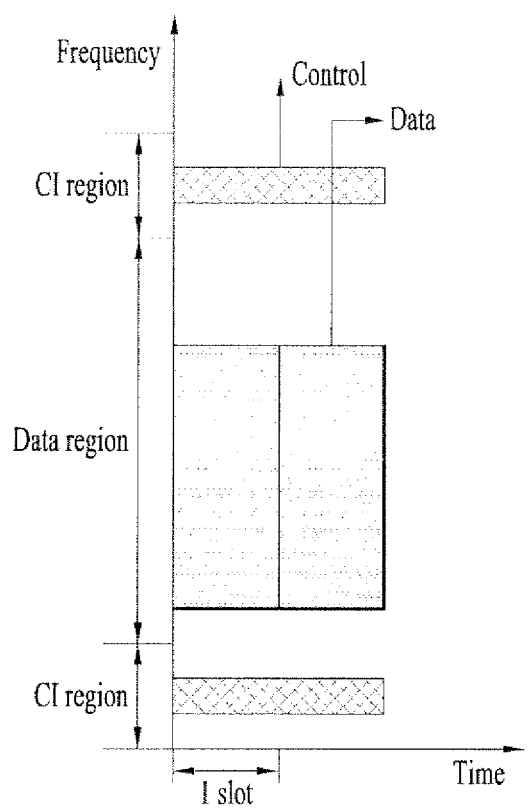

FIGS. 19 and 20 illustrate an example of a scheme that CI and data are independently transmitted. In particular, the CI is assigned to an edge of a bandwidth and the data and PUSCH are assigned to a region in which the data is transmitted. In this case, the region in which the CI is transmitted and the region in which the data is transmitted can be determined in advance or can be signaled by a network via physical layer signaling or higher layer signaling. FIG. 19 illustrates an embodiment for the method above. Or, as illustrated in FIG. 20, it may not apply slot hopping while control diversity is obtained. This method can be applied when an RB size of a control region is small and the increase of PAPR is not big in 3-cluster transmission. In this case, CI, which are transmitted in a manner of being separated in frequency domain, can include the same information. In this case, additional DFT precoding can be applied to the CI to transmit the CI. Or, one DFT precoding can be applied to the CI and the CI can be transmitted in a manner of being separated in frequency domain only. When the CI is separated in the frequency domain in a CI region, it may apply a frequency domain offset to the CI. In this case, if a frequency domain offset of the same size is applied to all CI resources, the CI resources may have the same frequency domain diversity irrespective of a CI region at which the CI resources are transmitted.

Figure 21:
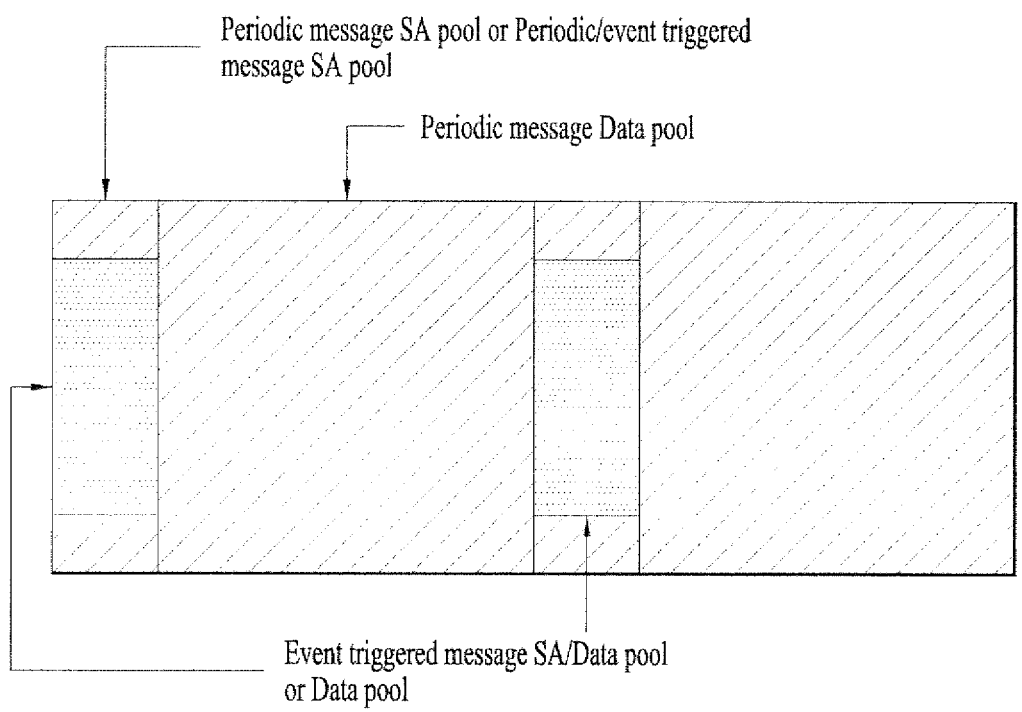
Figure 22:
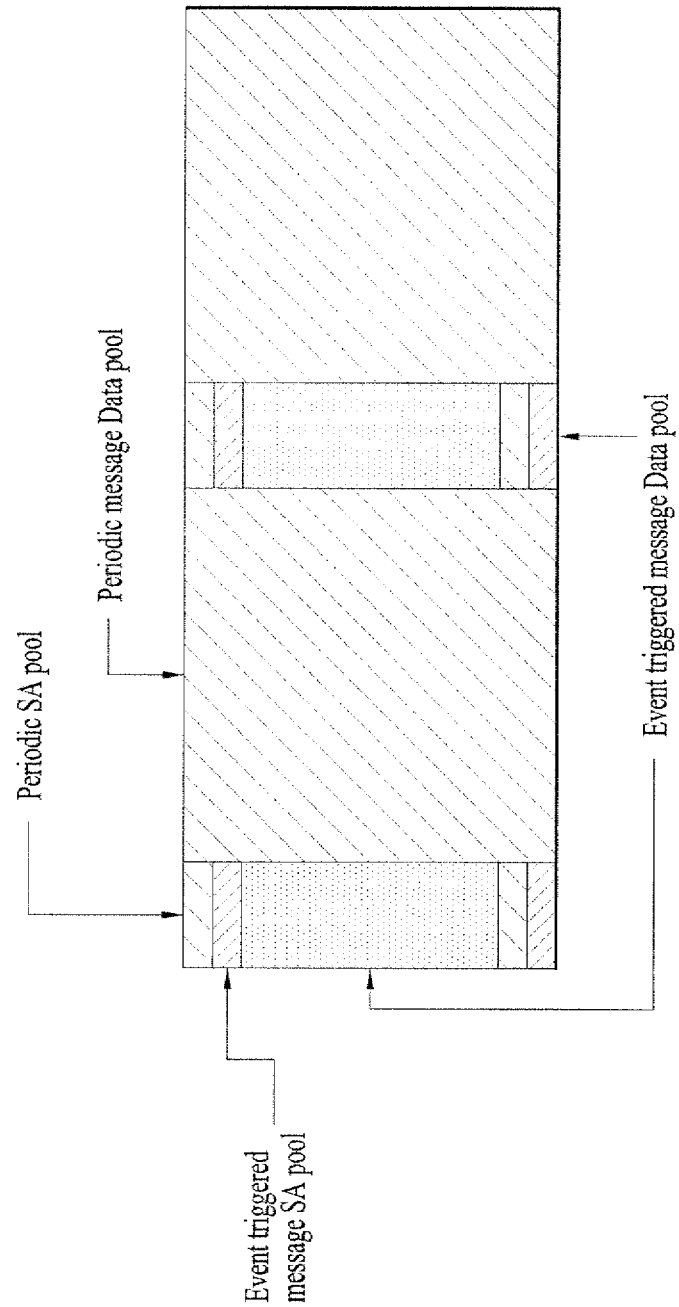
Figure 23:
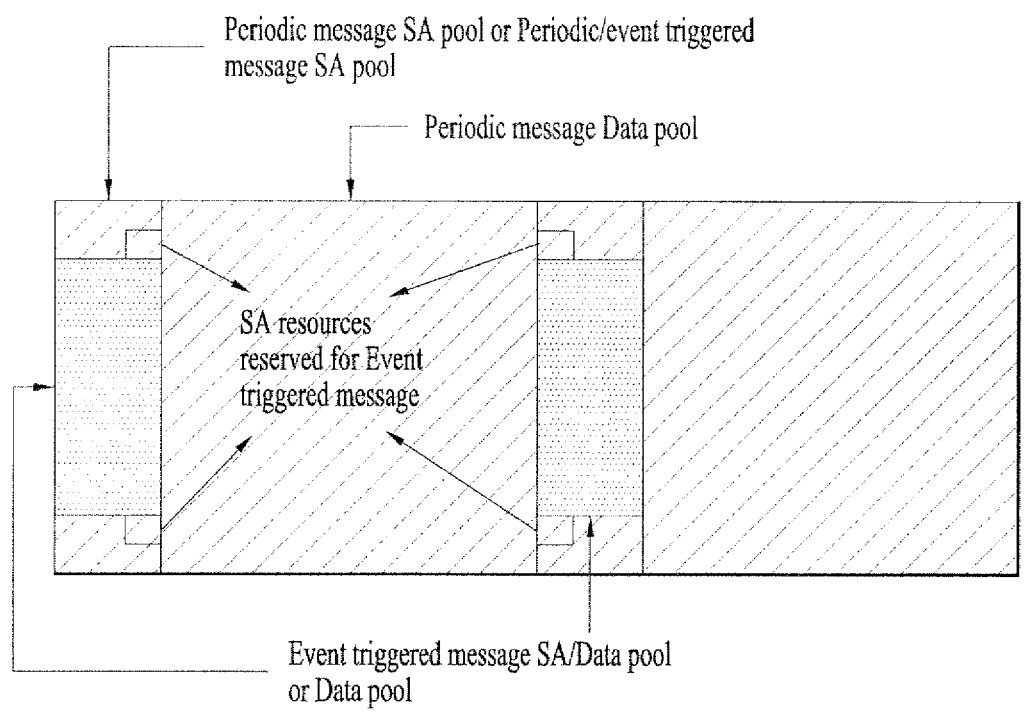

FIGS. 21 to 23 illustrate a scheme of configuring a pool of an event triggered message and an SA pool in the same subframe. In this case, when SA of a periodic message and data are TDMed and the pool of the SA is configured by a size for solving HDC, as mentioned earlier in FIG. 17, it is able to solve a problem that a frequency resource of the SA pool is wasted. Specifically, a partial SA resource of the SA pool can be reserved for the purpose of transmitting an event triggered message. Or, a UE transmitting the event triggered message can select and transmit an SA resource. When the partial SA resource of the SA pool is reserved for the purpose of transmitting the event-triggered message, the partial SA resource of the SA pool can be randomly determined in every period. Or, the partial SA resource of the SA pool can be determined by a hopping pattern, which is determined by a specific ID or a parameter indicated by a network via higher layer signaling. Or, an SA pool for an event triggered message can be additionally and partly configured in an SA pool for a periodic message. Or, when an event-triggered message is implicitly transmitted, a periodic message is not transmitted in a corresponding SA period and the event triggered message can be indicated using legacy SA. In this case, application of T-RPT is excluded, data and SA are transmitted together in a subframe in which the SA is transmitted, and frequency RA and MCS can be indicated via the SA. Or, RA of the event-triggered message is fixed or is determined depending on an SA pool size (e.g., the remaining frequency region of the SA pool or a part of the remaining frequency region corresponds to an event triggered message transmission size) and MCS can be transmitted in a piggyback form.

Contents Included in Control Information

In the following, contents included in SA are explained.

An ID field or a source (group) ID field can be included in SA. This field can be used as a seed value that enables a UE to have a different hopping pattern according to a source for T-RPT randomization. Or, the ID can be originated from a destination ID of a higher layer. In this case, since a scheme of selecting an ID included in the SA is different according to a UE, an ID can be included in the SA in a manner that a Tx UE generates a different ID.

An ID may not be included in the SA contents to reduce a bit field of the SA. In this case, all or a part of a DMRS base sequence, CS (cyclic shift), OCC, and a scrambling sequence can be determined using a different field rather than the ID. In this case, all or a part of RA, MCS, a priority level, a next reservation section length (a position of a resource to be transmitted next on the basis of a current transmission resource), a timing offset between SA and data, T-RPT, a retransmission number, and the like can be utilized. For example, the RA field can be used for generating an RS/scrambling sequence. In this case, there is a possibility that UEs using the same resource use the same RS. Hence, it may differently configure CS and/or OCC using a different field (all or a part of MCS, priority level, reservation section length, etc.) to make RSs to be orthogonal to each other.

Or, the ID can be transmitted with a reduced length. In this case, since the ID length is not sufficient, a collision may occur between an RS and a scrambling sequence. Hence, the RS/scrambling sequence can be generated using all or a part of the ID field. Or, the ID can be transmitted in a manner of being masked by a CRC field without being explicitly transmitted. In this case, it may determine a rule that combining is performed on the same SA ID (or, CRC ID) only. Meanwhile, for example, the CRC field is masked with a predetermined ID and the RS/scrambling sequence can be generated using the CRC field itself. And, an RS/scrambling sequence generated for data can be determined using all or a part of fields transmitted to a CRC ID and/or SA. In other word, the RS/scrambling sequence generated for data is generated using a 'predetermined' partial field included in the SA (whether to use a field for generating the RS/scrambling sequence should be determined in advance). In this case, the CRC field is appropriate. The CRC field is differently generated according to information of a different field included in the SA and corresponds to a field for checking whether or not data has an error. In this case, when contents of SA are different, CRC fields of UEs may vary. Hence, an RS/scrambling sequence of data can be differently generated according to a UE. As a different embodiment, while a partial ID is explicitly included, the remaining ID can be transmitted in a manner of being masked with a CRC (using a partial bit sequence of the CRC field). In this case, it may be able to determine a rule that an RS sequence/scrambling sequence of data is generated using all or a part of an explicit ID, an ID masked with a CRC, and a field transmitted in a manner of being included in SA. Or, an RS sequence and a scrambling sequence can be generated using all or a part of an ID and a specific field included in SA. In this case, although it is able to use the ID to distinguish UEs from each other, the ID may also provide a help to an Rx UE when the Rx UE performs a HARQ combining operation. According to legacy LTE release 12/13 D2D, a DMRS sequence/scrambling sequence is generated using an ID included in 8-bit SA. In order to perform an additional randomization operation, a DMRS sequence and a scrambling sequence can be generated using ID N bits and M bits of a different field. For example, a scrambling sequence and a DMRS can be generated by combining an ID of 8 bits with 8 bits of a different field included in SA.

A UE type field can be included in SA. Specifically, information indicating a P-UE, a V-UE, or an RSU can be included in the SA. If a pool is divided, the information may not be included in the SA. Yet, when cellular timing is different from GPS timing or timing is different between cells while using the cellular timing, if overlap occurs between pools, the information can be included in the SA.

A priority level (message type or message size) field can be included in the SA. If an SA pool is divided, this field may not be included in the SA.

MCS can be included in the SA field. In this case, 64QAM can be excluded from an MCS value. In this case, since it is not necessary for UEs to implement the 64QAM, implementation of a UE can be simplified. However, it may include the 64QAM for performance enhancement between links of future sidelink (D2D) communication.

A hopping flag (1 bit) can be included in the SA field. Since the hopping flag is included in a legacy SA field, it is regarded as the hopping flag is necessary. However, if wideband transmission is performed, since the hopping flag field is unable to obtain performance gain, the hopping flag field can be used as a different usage. For example, when a message of a big size is transmitted by combining event triggered messages or a plurality of messages or an RB size is equal to or greater than a predetermined threshold, the hopping flag field can be used for designating different information. For example, when a transmitted message corresponds to an event-triggered message, the hopping flag field can be used as an indicator indicating wideband transmission or a message for forwarding a plurality of narrow band signals (e.g., by RSU). Or, when SA is transmitted in every data transmission or SA indicates a HARQ process number and RV of data, if a resource is selected via separate sensing according to each transmission, it may not apply frequency hopping. In this case, it may not transmit a hopping flag in the SA.

A slot hopping flag can be included in the SA. The slot hopping flag field corresponds to a field for indicating whether or not slot hopping of data is performed. The slot hopping flag field can be configured by a network. If the slot hopping flag field is preconfigured, the slot hopping flag field may not be included in the SA.

RA can be included in the SA.

In relation to RA information on a frequency axis, an RA bit size can be reduced according to the number of subchannels. For example, when a frequency resource is divided into the N number of subchannels, if it is assumed that overlap is prohibited between subchannels, bits as many as ceil (log 2(N*(N+1)/2)) are necessary. In particular, it may have a merit in that it is able to reduce the number of bits in an RA field in a legacy RB unit. If data and SA are FDMed, in particular, if SA and data are continuously FDMed, a starting frequency position can be indicated by a position of the SA. Hence, it may be able to reduce more bits. For example, if a position of an end RB is indicated only and a frequency resource is divided into subchannels, an RA field as much as ceil(log 2(N)) is required only. Meanwhile, since a method of reducing the RA field is able to perform various RAs, similar to a legacy method, the method can be indicated in a unit of RB. In order to make UEs perform a common operation in a specific operation, resource allocation can be performed in an RB unit. Yet, a practically used resource can be allocated in a unit of a specific subchannel. A network can signal a resource allocation unit to UEs via physical layer signaling or higher layer signaling. The abovementioned operation can be used not only for a resource allocation operation but also for an energy sensing operation or a resource reselection operation. In particular, a resource selection/reselection/sensing operation can be performed in a resource unit signaled by the network.

In relation to RA information on a time axis, if continuous transmission is assumed, a bit size can be reduced. Yet, T-RPT bit can be used similar to a legacy method. In this case, in order to make each UE have a different hopping pattern, it may add a randomization seed value. If the aforementioned ID field is not used, it may add a separate T-RPT randomization field. It may indicate a repetition number per MAC PDU only or it may indicate (total transmission opportunity+repetition number per MAC PDU). All or a part of 1, 2, 4, 8, and 16 can be indicated as a repetition number. Or, a field indicating the number of SA periods during which SA is maintained, a field indicating the timing at which an RA of SA is applied, and a field indicating the timing (or, SA period) at which T-RPT starts can be included. Or, the number of MAC PDUs transmitted via SA can be included.

Meanwhile, RS sequence hopping can be used for SA or data. In this case, current RS hopping is configured to be changed according to a slot. If the number of RSs in a subframe/TTI exceeds 2, sequence hopping may vary according to an RS or a slot. If the sequence hopping varies according to an RS, a different sequence is used according to an adjacent RS. If the sequence hopping varies according to a slot, an RS included in a slot uses the same base sequence. In the latter case, since the same sequence is transmitted within a slot, if a frequency offset is big, it is able to assume that the same sequence is transmitted in the same slot when interpolation is performed between RSs, thereby increasing performance. In the former case, since a different RS sequence is used, if a frequency offset including a very big sequence occurs, the sequence is randomized. Hence, it may have a merit in that an impact of ICI within a symbol is relatively cancelled. Meanwhile, the abovementioned RS hopping scheme or information on whether or not hopping is performed can be differently configured according to a sidelink channel. For example, in case of SA, it may be able to configure an RS sequence to be hopped between slots. In case of data, it may vary (hop) according to an RS sequence. In case of data, a seed ID used for sequence hopping can be indicated by the SA.

Information indicating eNB timing or GNSS timing can be included in PSBCH contents or a PSS ID. Or, SA can be transmitted with the GNSS timing and data can be transmitted with the eNB timing in the in coverage (DL timing or UL timing). In this case, an offset between the GNSS timing and the eNB timing can be signaled by including the offset in the SA.

A reserved bit can be included in the SA field. For example, when a cross carrier operation is performed, a carrier indication field indicating a carrier on which data is transmitted after SA transmission can be included in the SA. Or, a reserved field can be included in the SA for a field indicating a carrier on which RV is transmitted and retransmission is performed after SA transmission. A length of the reserved bit included in the SA can be determined in advance or can be signaled by a network via physical layer signaling or higher layer signaling.

TA is not included in the SA. In case of a mode 1 (or an eNB-based scheduling mode), since transmission is performed with DL timing or GNSS timing and a TA bit field size corresponding to 11 bits is relatively big, it may be preferable to exclude the TA field from the SA to secure a coding rate. In case of the mode 1, when a UE performs transmission with reference to the GNSS timing, it is not necessary for the UE to have the TA field. However, if a UE uses cellular timing and the mode 1, the TA field can be included in the SA. For any other cases, the TA field is not used or can be set to all zeros. In particular, in case of using the mode 1, if transmission is performed with reference to the GNSS timing, the TA field is not used or can be set to all zeros. As an exceptional operation in the mode 1, a timing reference (GNSS or eNB) can be configured in advance according to an SA resource pool to determine whether or not a UE uses the GNSS timing. If an SLSS ID of SLSS associated with an SA pool uses a resource reserved for the GNSS, a UE is able to know that a signal received in the SA pool does not use the TA field although a mode corresponds to the mode 1.

Method of Transmitting SA and/or Data

In the following, a method of transmitting SA (D2D control signal, PSCCH) and data (D2D data, PSSCH) is explained according to one embodiment of the present invention. In particular, following description relates to a case of transmitting SA and data in a FDM form in V2X, V2V, and the like. However, the following description can also be applied to a case of transmitting SA and data in a TDM form in a range that technical features are not contradicted. In particular, since the SA has a fixed RB size and uses separate DFT precoding and the data has various RB sizes, the following description relates to a method of determining an RB size and a DFT precoding size of the data.

A UE can select at least one subchannel from among a plurality of subchannels (e.g., 1, 3, 5, 8, 10, 15 or 20 subchannels may exist on the entire frequency bands) in frequency domain. The UE selects a resource in a unit of a subchannel. This is because, if a specific UE uses a too small RB, a resource region is fragmented. Moreover, if the UE selects a resource in a unit of a subchannel, it is able to reduce signaling overhead which is necessary for indicating a resource allocation size in SA. A subchannel includes one or more resource blocks (e.g., 5, 6, 10, 15, 20, 25, 50, 75, or 100 resource blocks). The UE can select a resource block to transmit SA and data. In this case, the SA and the data can be transmitted in continuous resource blocks or discontinuous resource blocks.

When a resource block for transmitting data is selected, a UE selects one or more resource blocks to transmit PSSCH on a subchannel. The UE can transmit the PSSCH via the one or more selected resource blocks. In this case, when the number of the one or more selected resource blocks is determined, the greatest value not exceeding the total number of resource blocks usable for transmitting PSSCH on a subchannel can be used only among values resulted from multiplying an exponentiation of 2, an exponentiation of 3, and an exponentiation of 5 ($2^{\alpha_1} \cdot 3^{\alpha_2} \cdot 5^{\alpha_3}$). Among an exponent of the exponentiation of 2, an exponent of the exponentiation of 3, and an exponent of the exponentiation of 5, the exponents ($\alpha_1, \alpha_2, \alpha_3$) correspond to integers which are not a negative number. In particular, the number of the one or more selected resource blocks should be determined by a number corresponding to a (common) multiple of the exponentiations of 2, 3, and 5 (including a multiple of the multiplication of the exponentiations of 2, 3, and 5) and the number less than the number of RBs constructing a single subchannel or a plurality of subchannels. When a size of DFT precoding does not have a form of multiplying exponentiations of 2, 3, and 5, for example, when the DFT precoding is performed with a size of 23 RBs, implementation complexity of the DFT precoding increases. In particular, when a limit is set to the number of resource blocks, it is able to lower the complexity of the DFT precoding in SC-FDM. However, since a UE does not precisely use resource blocks in a subchannel unit, it may be necessary to have additional signaling. In this case, if a transceiver is configured to use the greatest value not exceeding the number of RBs constructing a subchannel indicated by a UE, it is able to know the number of RBs used by the Tx/Rx UE to transmit PSSCH without additional signaling. In particular, the proposed method has a merit in that implementation complexity of a UE is lowered and additional signaling is not necessary. Meanwhile, the Tx UE leaves a part of RBs constructing a subchannel without using all of the RBs. In this case, a part of the RBs plays a role of a guard band with a UE using a different subchannel. In D2D communication, interference occurs due to in-band emission that emits a signal between UEs to a non-allocated RB. Hence, if a part of the RBs is not used, it may bring about an effect of mitigating the in-band emission.

Figure 24:
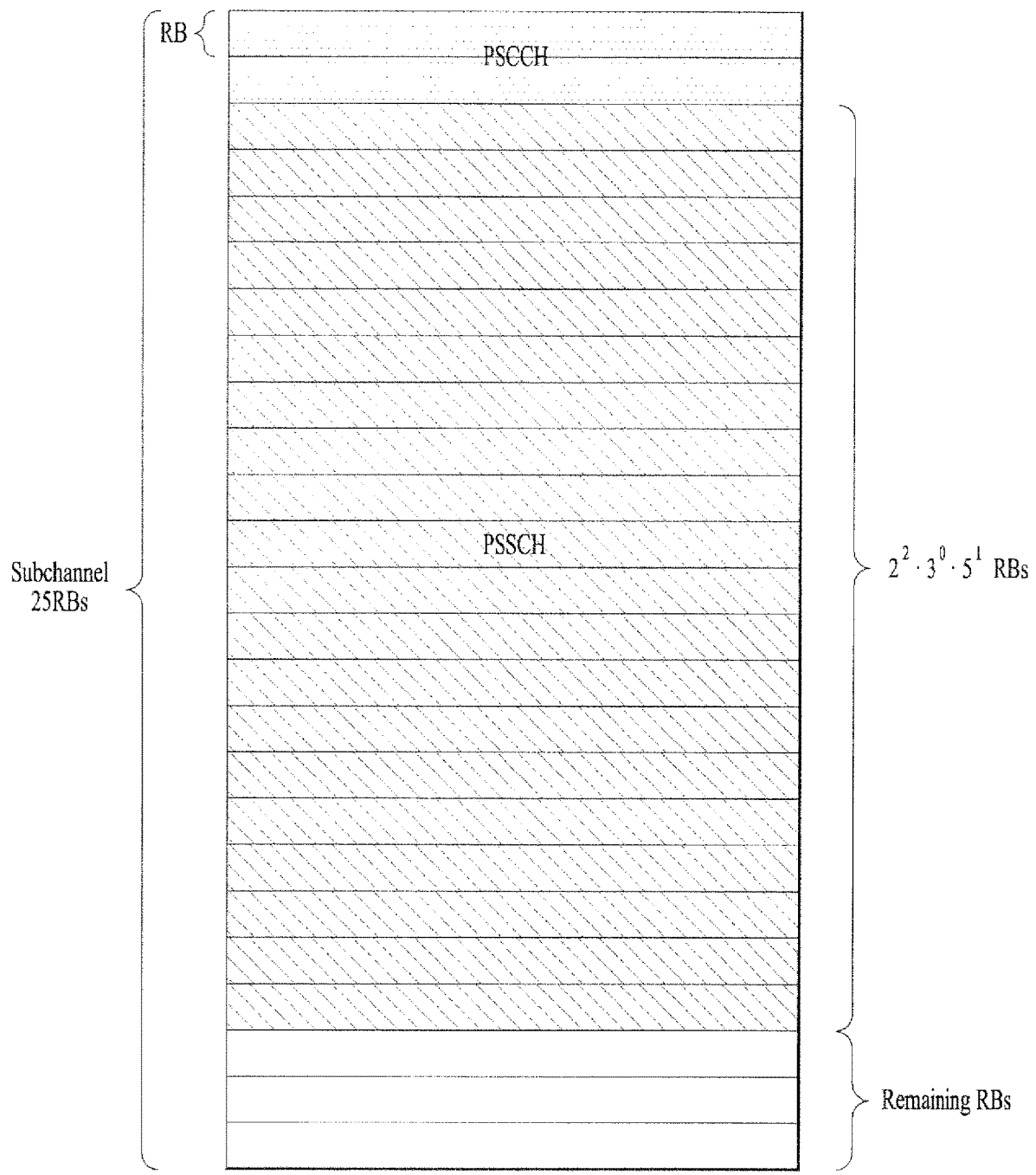
FIG. 24 is a diagram illustrating a method of selecting a resource block on a subchannel according to one embodiment of the present invention.

FIG. 24 illustrates a method of selecting resource blocks according to the aforementioned method. In FIG. 24, assume a system supporting a subchannel consisting of 25 RBs only. In this case, although 23 RBs are usable for transmitting data, it may transmit data using 20 RBs corresponding to a common multiple of 2, 3, and 5 and less than 23 RBs. In FIG. 24, a case of continuously transmitting SA and data is assumed. Hence, among the total number of RBs included in a subchannel, the number of RBs except 2 RBs for SA corresponds to the number of RBs usable for transmitting PSSCH. In particular, when PSCCH and PSSCH are transmitted in continuous resource blocks, the total number of resource blocks usable for transmitting the PSSCH on a subchannel can be obtained by subtracting the number of resource blocks used for transmitting PSSCH from the total number of resource blocks of the subchannel.

On the other hand, when PSCCH and PSSCH are transmitted in discontinuous resource blocks, the total number of resource blocks usable for transmitting the PSSCH on a subchannel corresponds to the total number of resource blocks of the subchannel. This can also be applied to a case that SA and data are discontinuously configured in a resource region. When a subchannel of data is selected, an available RB size can be selected by a size less than the number of RBs constructing a subchannel or a plurality of subchannels, the size which is the greatest among numbers corresponding to multiples of an exponentiation of 2, an exponentiation of 3, and an exponentiation of 5, and the size less than the number of RBs constructing the selected subchannel.

As a different example, when two subchannels each of which has 5 RBs are configured and 2 RBs of each subchannel are used for transmitting PSCCH, 3 RBs are used to transmit PSSCH when a subchannel is selected and 8 RBs can be used to transmit PSSCH when two subchannels are selected.

The explanation on the number of resource blocks is applied to a case that SA and data are continuously transmitted and a case that an SA resource region and a data resource region are overlapped. However, the explanation can also be applied irrespective of whether or not overlap occurs.

Meanwhile, as the number of subchannels to be selected by a UE is getting smaller, the UE can preferentially select a subchannel positioned at an edge of the entire frequency band. In particular, when UEs select the less number of subchannels, it may be able to determine a rule that the UEs preferentially exclude the center subchannel (from the entire frequency band). In particular, when UEs perform narrowband transmission, it may be able to make the UEs select a subchannel of an edge part of a band to enable UEs performing wideband transmission to continuously select a wideband. To this end, it may consider putting a bias on energy measurement according to a subchannel or allocating a subchannel to an edge of a band for a UE performing narrowband transmission. For example, a subchannel for performing narrowband transmission is allocated to a part of which an index is low or high in an RB position and a subchannel for performing wideband transmission is separately set to the center of a band to make UEs performing wideband transmission freely select a wide band.

As a further different example, when an RB size of data is not a (common) multiple of an exponentiation of 2, an exponentiation of 3, and an exponentiation of 5 on a selected subchannel, it may be able to perform at least one operation selected from the group consisting of an operation of declaring misconfiguration of the subchannel and asking a base station to reconfigure a resource pool, an operation of stopping data transmission, an operation of reselecting a resource pool, an operation of performing resource reselection, and an operation of randomly selecting a data RB by ignoring the subchannel. In particular, when a UE selects a subchannel, a network makes the number of RBs constructing the selected subchannel(s) to be configured by a multiple of an exponentiation of 2, an exponentiation of 3, and an exponentiation of 5 only. Or, when the UE selects a subchannel, if the number of RBs constructing the selected subchannel is not a multiple of an exponentiation of 2, an exponentiation of 3, and an exponentiation of 5, it may be able to determine a rule to make the UE not to select the subchannel.

In the foregoing description, a subchannel can be defined as follows. When SA and data are always transmitted in a manner of being adjacent to each other, it may be able to define that a subchannel always includes an RB in which the SA is transmitted. If SA and data are defined by a separate resource pool (separated in frequency domain), a subchannel of the data can be configured by RBs of the data only. In particular, a candidate RB size constructing a subchannel may vary depending on a scheme of transmitting SA and data. The candidate RB size constructing a subchannel may correspond to one selected from the group consisting of {5, 6, 10, 15, 20, 25, 50, 75, 100}.

And, an RB size supported by LTE release 13 is applied to LTE release 14 V2V only. The maximum number of subchannels corresponds to 20 and the minimum candidate RB size may correspond to 4. However, if the abovementioned contents are applied to a non-adjacent case (a case that SA and data are transmitted in RBs not adjacent to each other), it may fail to use many RBs for sidelink transmission.

Hence, a candidate satisfying at least one of i) to iv) can be used for the non-adjacent case.

i) All or a part of candidates of an adjacent case (a case that SA and data are transmitted in RBs adjacent to each other) can be included in candidates of the non-adjacent case. For example, it may use values such as 5, 10 and the like.

ii) Assume that SA occupies 2 RBs in the adjacent case and 1:1 corresponding relationship is configured between the SA and a data subchannel. In this case, a candidate of a subchannel size of the non-adjacent case can be calculated by subtracting the number of RBS occupied by the SA from a subchannel size candidate. In particular, {3, 4, 8, 13, 18, 23, 48, 73, 98} may become a candidate. In this case, 3 can be excluded.

iii) A number incapable of performing DFT precoding can be replaced with the greatest number (a multiple of exponent of 2, 3, and 5, e.g., {4, 8, 12, 18, 20, 48, 72, 96} capable of performing DFT precoding with low complexity.

iv) When the number of candidates of the adjacent case corresponds to 9, it may add several candidates. In this case, it may add all or a part of candidates of the adjacent case. For example, 5, 10, and the like can be added. When a candidate of 5 is added, if 2 subchannels are generated in 15 RB system, since SA requires 4 RBs in total, 1 RB is left only. If 4 RBs are used, 12 RBs are used and 3 RBs are left without being used.

Transmission of SA and Data Transmitted Via Subband

When SA and data are FDMed in frequency domain, a resource pool can be differently configured depending on whether a control signal and data are transmitted in a manner of being adjacent to each other or in a manner of being separated from each other in frequency domain.

For example, when SA and data are signaled in a separate region in frequency domain, the SA and/or the data can be signaled by the N (e.g., N=2) number of subbands (types). In this case, when diversity of the SA is not significant, the number of subbands of the SA may correspond to 1. In this case, when a resource region of the SA is configured, it is able to reduce signaling overhead.

More generally, the number of subbands of the data and the number of subbands of the SA can be separately configured. By doing so, it may be able to maximize system performance by differently configuring a subband configuration. And, the number of subbands of the data and the number of subbands of the SA can be separately configured according to a carrier or a usage of a carrier. For example, when a specific carrier is configured as a V2V dedicated carrier and there is no cellular traffic, the number of subbands of the data and the number of subbands of the SA can be fixed by 1. When a specific carrier is configured as a shared carrier between cellular and V2V, the number of subbands can be configured by 2. This is intended to improve coexistence with cellular traffic. In particular, it is able to prevent a cellular resource from being fragmented and it makes a sidelink packet obtain diversity.

Meanwhile, a subband can be configured by a localized type or a distributed type. The localized type is to allocate a subband in physically continuous RBs in frequency domain and the distributed type is to configure a subband in a distributed form in frequency domain.

For example, when SA and data are transmitted in a manner of being adjacent to each other in frequency domain (to lower PAPR and CM (Cubic Metric)), a frequency resource region of a control signal can be configured by the distributed type. To this end, a network can signal all or a part of a frequency starting (and/or ending) offset of a distributed resource, frequency spacing between distributed resources, a size (number of RBs) of a distributed resource, and the number of RBs of an individual cluster in a distributed resource to a UE via physical layer signaling or higher layer signaling. In this case, a configuration of a distributed resource can be separated in a sidelink resource region. For example, a resource region of SA can be configured in a distributed type in a sidelink resource region consisting of the N number of subbands. In this case, multiple subbands are regarded as contiguous resource regions and the resource regions can be configured by the M number of distributed resources. In this case, N and M may correspond to values determined in advance or values signaled by a network.

Meanwhile, (when SA and data are transmitted in a manner of being adjacent to each other) a field/indicator for indicating whether signaling of a resource region corresponds to a distributed type or a localized type can be signaled to a UE via physical layer signaling or higher layer signaling. The localized type signaling signals the number of subbands, a frequency offset (starting and/or end), a subband size, and the like to a UE and the distributed type signaling can signal all or a part of the number of subbands, a frequency offset, a subband size, a size of a distributed resource, the number of cluster RBs in a distributed resource, a frequency starting/ending offset of a distributed resource, the number of distributed resources, frequency spacing of a distributed resource, and the like to a UE.

Meanwhile, a resource region of a distributed type can be differently configured according to characteristic of a carrier. For example, when a sidelink and a cellular link coexist in a carrier, frequency domain is configured in a form of a subband and a signal can be transmitted again in the subband. Or, the configured subband can be configured in a distributed type of a frequency unit (e.g., subchannel) for performing measurement and the like. For example, when a frequency resource is configured by two subbands and the subbands can be divided into the M number of resources. In this case, a starting position, an ending position, or a specific position of the M number of resources can be configured as a region in which a control signal is transmitted. According to the present method, a resource is configured in a form of a subband to prevent a cellular link from being fragmented and the subband is divided into subchannels to make a UE transmit SA and data in a unit of a subchannel. On the other hand, since a resource configuration in a subband form may not be significantly necessary in a dedicated carrier, a resource region can be immediately configured in a form of a resource division of a subchannel form. In particular, all frequency resources are divided into the M number of resources and a specific position (start, end, or a specific position positioned at the center) of each of the M number of resources is configured as a region capable of transmitting SA.

Time Resource Region (Time Resource Pool) and Method of Configuring CP Length

When a control signal and data are FDMed, SA and data can be configured by a bitmap in a time resource region. By doing so, it is able to lower signaling overhead. In particular, when data and a control signal are FDMed in the aspect of a UE or a system, an indication of a time region and an indication of a resource region are integrated by a single bitmap or single signaling and can be signaled via physical layer signaling or higher layer signaling. When SA and data are FDMed in the aspect of a UE or a system, a control signal and data can be configured by a single CP length. In particular, when a control signal and data are FDMed in the aspect of a UE, if the UE uses a different CP for the control signal and the data, it is necessary to have a complex configuration to transmit an actual signal. In particular, it is not suitable for reducing implementation complexity of the UE. Hence, if the data and the control signal have the same CP length and signals are transmitted at the same time using a single OFDM symbol generator, implementation of the UE can be simplified. To this end, it is necessary for a network to set the same CP length to the data and the SA. However, when a control signal and data are FDMed in the aspect of a system, a different situation may occur. When a control signal and data are FDMed in the aspect of a system only, if an individual UE assumes that there is no possibility of transmitting SA and data at the same time within a TTI, the data and the control signal can be configured by a different CP length. To this end, a network can configure a guard band between an SA region and a data region to make an Rx UE efficiently detect a signal. And, Rx UEs are required to have UE capability to configure a frequency domain band pass filter in the SA region and the data region to cancel ISI which occurs due to a different CP length. In particular, a network can configure a CP length of a control signal and a CP length of a data resource region, respectively, according to whether or not a UE is able to transmit a control signal and data at the same time. Or, the network can configure a single common CP length as well.

The aforementioned description can be applied not only to D2D communication but also to uplink or downlink. In this case, a base station, a relay node, and the like can use the proposed method.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 25:
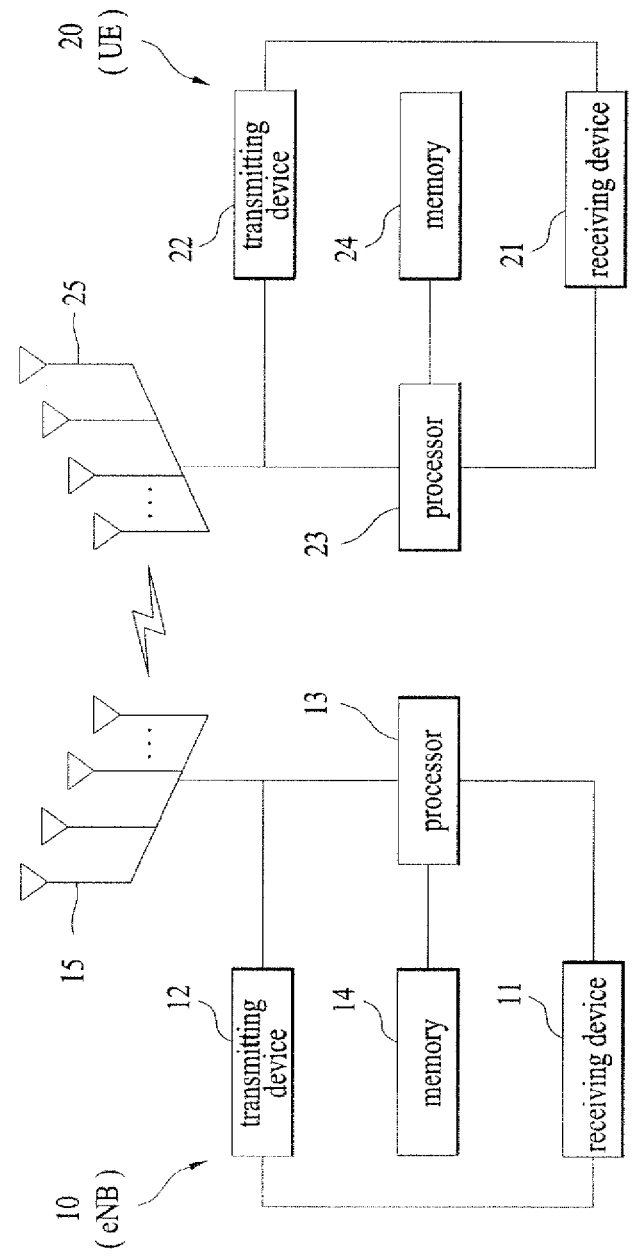
FIG. 25 is a diagram illustrating configurations of a transmission apparatus and a reception apparatus.

FIG. 25 is a diagram for configurations of a transmit point apparatus and a UE.

Referring to FIG. 25, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10. The processor 13 of the transmit point apparatus 10 according to one embodiment of the present invention may perform processes necessary for the embodiments described above.

Besides, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 25, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above. Specifically, the processor selects one or more resource blocks to transmit PSSCH on a subchannel and transmits the PSSCH using the transmit module via the selected one or more resource blocks. The number of the selected one or more resource blocks may correspond to the greatest value not exceeding the total number of resource blocks usable for transmitting the PSSCH on the subchannel among values corresponding to multiplication of exponentiations of 2, 3, and 5.

In addition, the processor 23 of the UE device 20 may perform a function of processing information received by the UE device 20, information to be transmitted by the UE device 20, and the like. The memory 24 may store the processed information during a prescribed time period and be substituted with a component such as a buffer (not shown in the drawing) or the like.

The configurations of the transmission point device and the UE device may be implemented such that the above-described embodiments can be independently applied or two or more thereof can be simultaneously applied, and redundant description is omitted for clarity The description of the transmission point device 10 in FIG. 25 may be equally applied to a relay as a downlink transmission entity or an uplink reception entity, and the description of the UE device 20 in FIG. 25 may be equally applied to a relay as a downlink reception entity or an uplink transmission entity.

The embodiments of the present invention may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method of transmitting a PSSCH (Physical Sidelink Shared Channel), which is transmitted by a D2D (Device-to-Device) user equipment (UE) in a wireless communication system, comprising the steps of:
determining, by the UE, a greatest value not exceeding the total number of resource blocks usable for transmitting the PSSCH on one or more subchannels among values calculated from $2^{\alpha_1} \cdot 3^{\alpha_2} \cdot 5^{\alpha_5}$, where each of $\alpha_2, \alpha_3, \alpha_5$ is a non-negative integer,
transmitting, by the UE, the PSSCH via RBs (resource blocks) corresponding to the greatest value,
wherein, based on that RBs of the PSSCH and RBs of a PSCCH (Physical sidelink Control Channel) are consecutive, the number of RBs used for a transmission of the PSCCH is excluded from total number of RBs of the one or more subchannels to determine the total number of RBs usable for transmitting the PSSCH.

2. The method of claim 1, wherein, based on that the RBs of the PSSCH and the RBs of a PSCCH are non-consecutive, the number of RBs used for a transmission of the PSCCH is not excluded from total number of RBs of the one or more subchannels to determine the total number of RBs usable for transmitting the PSSCH.

3. The method of claim 1, wherein the total number of RBs of the one or more subchannels corresponds to one selected from the group consisting of 5, 6, 10, 15, 20, 25, 50, 75, and 100.

4. The method of claim 1, further comprising the step of selecting, by the UE, the one or more subchannels.

5. The method of claim 4, wherein when the number of one or more subchannels to be selected by the UE is getting smaller, the UE preferentially selects a subchannel positioned at an edge of the entire frequency band.

6. A D2D (Device-to-Device) user equipment (UE) transmitting a PSSCH (Physical Sidelink Shared Channel) in a wireless communication system, comprising:
a transmitter and a receiver; and
a processor, the processor configured to determine a greatest value not exceeding the total number of resource blocks usable for transmitting the PSSCH on one or more subchannels among values calculated from $2^{\alpha_1} \cdot 3^{\alpha_2} \cdot 5^{\alpha_5}$, where each of $\alpha_2, \alpha_3, \alpha_5$ is a non-negative integer, wherein the processor is configured to transmit the PSSCH via RBs (resource blocks) corresponding to the greatest values, wherein, based on that RBs of the PSSCH and RBs of a PSCCH (Physical sidelink Control Channel) are consecutive, the number of RBs used for a transmission of the PSCCH is excluded from total number of RBs of the one or more subchannels to determine the total number of RBs usable for transmitting the PSSCH.

7. The UE of claim 6, wherein, based on that the RBs of the PSSCH and the RBs of a PSCCH are non-consecutive, the number of RBs used for a transmission of the PSCCH is not excluded from total number of RBs of the one or more subchannels to determine the total number of RBs usable for transmitting the PSSCH.

8. The UE of claim 6, wherein the total number of RBs of the one or more subchannels corresponds to one selected from the group consisting of 5, 6, 10, 15, 20, 25, 50, 75, and 100.

9. The UE of claim 6, wherein when the number of one or more subchannels to be selected by the UE is getting smaller, the UE preferentially selects a subchannel positioned at an edge of the entire frequency band.

* * * * *